United States Patent
Hirai

(10) Patent No.: US 7,813,233 B2
(45) Date of Patent: Oct. 12, 2010

(54) INFORMATION RECORDING AND REPRODUCTION APPARATUS INCLUDING OPTICAL PICKUP UNIT

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 718 days.

(21) Appl. No.: 11/702,159

(22) Filed: Feb. 5, 2007

(65) Prior Publication Data

US 2007/0133372 A1 Jun. 14, 2007

Related U.S. Application Data

(62) Division of application No. 11/201,197, filed on Aug. 11, 2005, now Pat. No. 7,345,967, which is a division of application No. 10/150,946, filed on May 21, 2002, now Pat. No. 7,006,411.

(30) Foreign Application Priority Data

Jun. 13, 2001 (JP) .............................. 2001-178502
Dec. 5, 2001 (JP) .............................. 2001-371079

(51) Int. Cl.
G11B 7/00 (2006.01)
(52) U.S. Cl. .............................. 369/44.32; 369/112.01; 369/112.16; 369/112.18; 369/44.11; 369/112.02; 369/44.23
(58) Field of Classification Search ............ 369/112.01, 369/112.07, 44.11, 44.32, 44.23, 112.02, 369/112.16, 112.18
See application file for complete search history.

(56) References Cited

U.S. PATENT DOCUMENTS

| 5,260,927 A | 11/1993 | Higashihara et al. |
| 5,569,517 A | 10/1996 | Tominaga et al. |
| 5,592,461 A | 1/1997 | Tsujioka et al. |
| 5,847,806 A | 12/1998 | Mihashi |
| 6,125,088 A | 9/2000 | Ogasawara |
| 6,167,019 A | 12/2000 | Tsuchiya et al. |
| 6,321,028 B1 * | 11/2001 | Kajiyama et al. ........... 386/126 |
| 6,344,935 B1 | 2/2002 | Maruyama |
| 6,430,130 B1 | 8/2002 | Furukawa |
| 6,532,202 B1 * | 3/2003 | Wada et al. ............ 369/112.02 |
| 6,545,958 B1 | 4/2003 | Hirai et al. |
| 6,656,560 B2 | 12/2003 | Yamamoto et al. |

(Continued)

FOREIGN PATENT DOCUMENTS

JP 06-096485 4/1994

(Continued)

OTHER PUBLICATIONS

Japanese Office Action.

*Primary Examiner*—Wayne R Young
*Assistant Examiner*—Latanya Bibbins
(74) *Attorney, Agent, or Firm*—Dickstein Shapiro LLP

(57) ABSTRACT

An optical pickup unit includes a light source emitting a light beam, an objective lens focusing the light beam onto an information recording medium, a light detection part receiving the light beam reflected from the information recording medium, and a light blocking part selectively blocking a part of the light beam with respect to a radial direction. The light blocking part is provided in an optical path of the light beam centered on an optical axis.

18 Claims, 20 Drawing Sheets

U.S. PATENT DOCUMENTS

| | | |
|---|---|---|
| 6,728,174 B1 | 4/2004 | Sako et al. |
| 6,738,332 B2 * | 5/2004 | Sato et al. ................. 369/53.28 |
| 6,756,575 B2 * | 6/2004 | Tadano et al. ............ 250/201.5 |
| 6,859,429 B2 * | 2/2005 | Ogasawara et al. ..... 369/112.02 |
| 6,927,923 B2 * | 8/2005 | Kimura ...................... 359/719 |

FOREIGN PATENT DOCUMENTS

| | | |
|---|---|---|
| JP | 08-017065 | 1/1996 |
| JP | 9-27141 | 1/1997 |
| JP | 9-128785 | 5/1997 |
| JP | 10-20263 | 1/1998 |
| JP | 10-247330 | 9/1998 |
| JP | 10-255301 | 9/1998 |
| JP | 10-269611 A | 10/1998 |
| JP | 11-259892 | 9/1999 |
| JP | 2000-149309 | 5/2000 |
| JP | 2000-155979 | 6/2000 |
| JP | 2001-033734 | 2/2001 |
| JP | 2001-307349 | 11/2001 |

* cited by examiner

PERIPHERAL REGION B
CENTER REGION A
EFFECTIVE DIAMETER OF LIGHT BEAM

SPHERICAL ABERRATION

COMA

ASTIGMATISM

INFORMATION RECORDING AND REPRODUCTION APPARATUS INCLUDING OPTICAL PICKUP UNIT

CROSS-REFERENCE TO RELATED APPLICATIONS

The present application is a divisional of U.S. Pat. Ser. No. 11/201,197, filed Aug. 11, 2005 now U.S. Pat. No. 7,345,967, which is a divisional of Ser. No. 10/150,946, filed May 21, 2002, now U.S. Pat. No. 7,006,411, issued Feb. 28, 2006, the disclosure of which is incorporated by reference in its entirety.

BACKGROUND OF THE INVENTION

1. Field of the Invention

The present invention generally relates to optical pickup units and information recording and reproduction apparatuses, and more particularly to an optical pickup unit recording information on and reproducing information from information recording media and an information recording and reproduction apparatus including such an optical pickup unit.

2. Description of the Related Art

Disk-type optical information recording media widely used nowadays are compact disks (CDs) such as CD-ROMs, CD-Rs, and CD-RWs and digital versatile disks (DVDs) such as DVD-ROMs, DVD-Rs, and DVD-RWs. Some CDs have realized a recording density of 650 MB. The DVDs are larger in capacity than the CDs, but have yet to satisfy the demands of users in terms of capacity. In this context, a so-called multilayer disk, a disk formed of a plurality of recording layers instead of a single recording layer, has been developed for achieving higher recording density.

In such an information recording medium of multiple recording layers, the recording layers are required to be separated from each other by tens of micrometers (μm) or more so that information may be recorded on and reproduced from each recording layer independently. However, distances from an objective lens to the recording layers are different so that spherical aberration occurs in recording layers out of an optimum position. That is, in such recording layers, the position of the focus of marginal rays (rays entering the periphery of a lens away from the optical axis thereof) entering a lens 90 shown in FIG. 1 is deviated in the direction of the optical axis from the position of the focus of paraxial rays (rays entering the central part of a lens) entering the lens 90.

FIG. 2 is a diagram for illustrating focusing of a light beam in the case of reproducing information from a multilayer disk by a single conventional optical pickup unit. In the case of reproducing information from a first recording layer 101a of a multilayer disk 101, the light beam is focused on the first recording layer 101a through an objective lens of the optical pickup unit at a position indicated by 100a as shown on the left side in FIG. 2. In the case of reproducing information from an $n^{th}$ recording layer 101n, which is farther away from a disk substrate surface 101s than the first recording layer 101a is, the light beam is focused on the $n^{th}$ recording layer 101n through the objective lens at a position indicated by 100b as shown on the right in FIG. 2.

If the optical pickup unit is optimized for focusing the light beam into a spot on the first recording layer 101a to reproduce the information therefrom, the optical pickup unit has no problem in reproducing the information from the first recording layer 101a. However, when the objective lens of the optical pickup unit gets closer to the disk substrate surface 101s of the multilayer disk 101 to reproduce the information from the $n^{th}$ recording layer 101n, and the light beam is focused into a spot on the $n^{th}$ recording layer 101n, spherical aberration occurs due to an interlayer thickness between the first and $n^{th}$ recording layers 101a and 101n. As a result, the spot formed on the $n^{th}$ recording layer 101n is larger in diameter than the spot formed on the first recording layer 101a as shown in FIG. 2.

In order to solve this problem, it is necessary to develop a new optical head control technology of performing aberration correction by measuring the amount of spherical aberration of a beam spot. Japanese Laid-Open Patent Application No. 2000-155979 discloses an aberration detection device as means for solving this problem.

FIG. 3 is a diagram showing a configuration of the aberration detection device. As shown in FIG. 3, a light beam emitted from a light source 201 and reflected from an optical disk 206 is split by a half mirror 202 to be divided into a light beam passing through a specific region and a light beam passing through the other regions by a hologram 209. The light beam passing through the specific region is deflected by the hologram 209 to be received by a plurality of photodetectors 207 so that the photodetectors 207 obtain respective signals. The obtained signals are compared so that an aberration is detected. The detected aberration is transmitted via an aberration signal processing circuit 208 to an aberration correction device 204 so that the aberration correction device 204 can be driven in real time based on the aberration so as to reduce the aberration of the optical system. In FIG. 3, reference numerals 203 and 205 denote a collimator lens and an objective lens, respectively.

The assembly conditions of a light-receiving element in the optical pickup unit are extremely strict so that the light-receiving element is required to be provided with an accuracy of a few micrometers or less. This reduces yield rate, thereby affecting the cost to a considerable extent. Further, the aging and temperature characteristics of the light-receiving element are subject to change. Therefore, it is desirable that a light-receiving element pattern be simple. However, according to the technology disclosed in Japanese Laid-Open Patent Application No. 2000-155979, an incident light beam for aberration detection is split into a plurality of beams by a hologram so that a plurality of light-receiving elements detect a given one of the split beams. Such a configuration, where each split beam is focused into a small spot and a plurality of light-receiving elements detect a given one of the split beams, is complicated and may impair the stability of the optical pickup unit. This may reduce yield rate, thereby incurring an increase in cost.

The optical pickup unit is known as a device for recording information on and reproducing recorded information from an information recording medium. The ratio of the intensity of a light beam focused onto the information recording medium for recording to that for reproduction ranges from 5:1 to 15:1. Generally, the emission power of a light source switches between recording time and reproduction time substantially in accordance with the ratio. However, in some semiconductor lasers, noise characteristics worsen as an output lowers.

That is, part of a light beam emitted from a semiconductor laser returns to the semiconductor laser as a returning light. A different resonator other than the semiconductor laser is formed between the returning light and the information recording medium. As a result, the state of oscillation of the semiconductor laser becomes unstable so that the output of the semiconductor laser includes noise. Further, noise is also generated in the output of the semiconductor laser by the operation of the semiconductor laser or a variation in environmental temperature. When the light-emission power of the semiconductor laser is far above a threshold current level to reach tens of milliwatts (mW), the light emission of the semiconductor laser is stable, being hardly affected by disturbances. However, when the light-emission power of the semiconductor laser is around the threshold current level, the light-emission power is affected by disturbances including those caused by the above-described returning light, so that variations are caused in the light-emission power.

Accordingly, in the case of recording information on (writing information to) the information recording medium or erasing information recorded thereon, the light emission of the semiconductor laser is hardly affected by disturbances since the light-emission power of the semiconductor laser is far above the threshold current level. However, in the case of reproducing (reading out) information from the information recording medium, the light-emission power of the semiconductor laser is normally set to a low level so that the semiconductor laser emits the laser beam with a power of a few milliwatts slightly over the threshold current level, for instance, a power of five milliwatts. In this case, therefore, the semiconductor laser is especially subject to the returning light to be unstable in emitting the laser beam. Accordingly, the signal is deteriorated by noise caused in the output of the semiconductor laser.

Japanese Laid-Open Patent Application No. 9-27141 discloses an optical pickup unit to solve this problem. According to this optical pickup unit, an electro-optical element capable of controlling transmittance of light is provided in an optical path from a light source to a recording medium. The electro-optical element controls transmittance for light emitted from the light source to a low rate (value) at a time of reproducing information, and to a high rate (value) at a time of recording information.

Further, in an optical pickup unit, light emitted from a semiconductor laser is focused onto a surface of an information recording medium through a focus optical system, and a reflected light from the information recording medium is directed through a detection optical system to a light-receiving element. Generally, the detection signal (electric current signal) of the light-receiving element of the optical pickup unit is converted into a voltage signal by a current-voltage conversion amplifier housed in the optical pickup unit to be output to a signal processing circuit.

If the amplitude level of the signal output through the current-voltage conversion amplifier is too low, a problem is caused in information reproduction. Therefore, such a configuration is employed that the gain of the current-voltage conversion amplifier is switchable so that the output amplitude level thereof falls within a proper range. However, in recent years, it has been required for the optical pickup unit to accommodate a plurality of conditions so as to be suitable for a variety of types of information recording media and various recording and reproduction conditions. Accordingly, in order to perform information recording, reproduction, and erasure in compliance with a plurality of types of optical disks, such as a CD-RW (compact disk rewritable), a CD-DA (compact disk digital audio), a CD-ROM, and a CD-R (compact disk recordable), as performed by an optical information recording and reproduction apparatus disclosed in Japanese Laid-Open Patent Application No. 10-255301, it is necessary to make such a gain switching circuit shown in FIG. 4 suitable for more combination patterns of disk types and light powers. Consequently, the number of resistors employed in the gain switching circuit increases so that the speed of response of a signal is reduced.

In addition, recently, it has been proposed to increase the numerical aperture (NA) of an objective lens for focusing a light beam onto an information recording medium so as to achieve high recording density. This is because the diameter of a beam spot can be reduced by using an objective lens of a large NA. However, as the NA increases, the rate of increase of aberration also increases. That is, spherical aberration, whose primary cause is a substrate thickness error in the information recording medium, is proportional to the NA to the fourth power, and coma, whose primary cause is the inclination of the information recording medium to the optical axis, is proportional to the cube of the NA.

Japanese Laid-Open Patent Application Nos. 10-20263, 9-128785, 11-259892, and 2000-155979 disclose techniques to correct and detect wavefront aberration (spherical aberration, coma, and astigmatism), which techniques are known as prior art for solving the above-described problems.

However, optical pickup units having such configurations as disclosed in the above-described references need to have their costs reduced by component sharing and their assembly processes simplified.

SUMMARY OF THE INVENTION

Accordingly, it is a general object of the present invention to provide an optical pickup unit and an information recording and reproduction apparatus in which the above-described disadvantages are eliminated.

A more specific object of the present invention is to provide an optical pickup unit that can stably perform spherical aberration detection, being made less subject to the effects of variations in its aging and temperature characteristics by providing a light-blocking part using a liquid crystal element in a substantially parallel optical path without increasing the number of light-receiving elements as in the conventional optical pickup unit, the optical pickup unit also realizing cost reduction by reducing the number of components and the number of assembly processes.

Another more specific object of the present invention is to provide an optical pickup unit including an electro-optical element dividing the region of a light beam passing therethrough so as to be capable of performing stable control without its light source being affected by noise at a time of reproduction, processing a light reception signal without decreasing response speed, and performing corrections based on wavefront aberration, the optical pickup unit realizing component sharing, reduction in the number of components, and simplification of assembly adjustment.

Yet another more specific object of the present invention is to provide an information recording and reproduction apparatus including any of the above-described optical pickup units.

The above-objects of the present invention are achieved by an optical pickup unit including a light source emitting a light beam, an objective lens focusing the light beam onto an information recording medium, a light detection part receiving the light beam reflected from the information recording medium, and a light blocking part selectively blocking a part of the light beam with respect to a radial direction, the light blocking part provided in an optical path of the light beam to be centered on an optical axis.

The above-described optical pickup unit is capable of detecting rays around the axis of a beam spot and the rays of the peripheral part of the beam spot separately. Therefore, spherical aberration, which is a phenomenon of a difference between focus positions, can be detected based on the detection signals of the rays.

Additionally, the above-described optical pickup unit may further comprise a control part generating an aberration signal by comparing a first signal generated based on a first part of the light beam passing through a first region of the light blocking part and a second signal generated based on a second part of the light beam passing through a second region of the light blocking part, the first region of the light blocking part being provided internal to the second region thereof.

Thereby, an amount of correction of spherical aberration can be set by using the aberration signal.

Additionally, the above-described optical pickup unit may further comprise a spherical aberration correction part correcting spherical aberration based on the aberration signal generated by the control part.

Thereby, the spherical aberration can be corrected based on the amount of correction obtained from the aberration signal.

Additionally, in the above-described optical pickup unit, the light blocking part and the spherical aberration correction part may form a single element.

Thereby, the above-described optical pickup unit, which can be realized with reduced space, has its number of components reduced so that cost reduction thereof can be realized.

The above objects of the present invention are also achieved by an information recording and reproduction apparatus including an optical pickup unit that includes a light source emitting a light beam, an objective lens focusing the light beam onto an information recording medium, a light detection part receiving the light beam reflected from the information recording medium, and a light blocking part selectively blocking a part of the light beam with respect to a radial direction, the light blocking part provided in an optical path of the light beam to be centered on an optical axis.

According to the above-described optical pickup unit, rays around the axis of a beam spot and the rays of the peripheral part of the beam spot can be detected separately. Therefore, spherical aberration, which is a phenomenon of a difference between focus positions, can be detected based on the detection signals of the rays.

The above objects of the present invention are also achieved by an optical pickup unit performing recording or reproducing information by making a light beam emitted from a light source incident on an information recording medium, the optical pickup unit including an electro-optical element switching values of transmittance of a given region through which the light beam passes depending on whether the information is recorded or reproduced.

Additionally, in the above-described optical pickup unit, the electro-optical element may be provided subsequent to the light source in an optical path between the light source and the information recording medium, and the transmittance of the given region of the electro-optical element may be controlled to a first value at a time of reproducing the information from the information recording medium and to a second value at a time of recording the information on the information recording medium, the first value being smaller than the second value.

Additionally, in the above-described optical pickup unit, the electro-optical element may include an outer region provided outside the given region so that the light beam passing through the outer region has a phase difference thereof selectively varied in the outer region.

According to the above-described optical pickup unit, stable control can be performed without noise affecting the light beam passing through the given region. Further, the light beam passing through the outer region has its phase difference selectively varied so that deterioration of the wave surface of the light beam incident on the information recording medium can be suppressed. Thereby, the spot performance of the light beam collected by an objective lens can be secured.

Additionally, in the above-described optical pickup unit, the light beam passing through the outer region may have the phase difference thereof selectively varied concentrically in the outer region.

Additionally, in the above-described optical pickup unit, the light beam passing through the outer region may have the phase difference thereof varied in the outer region step by step in a radial or a tangential direction.

Additionally, in the above-described optical pickup unit, the light beam passing through the outer region may have the phase difference thereof varied in the outer region simultaneously and asymmetrically in radial and tangential directions.

Thereby, wavefront aberration (spherical aberration, coma, and astigmatism) can be suppressed.

The above objects of the present invention are further achieved by an information recording and reproduction apparatus recording information on and reproducing information from an information recording medium, the information recording and reproduction apparatus including an optical pickup unit performing recording or reproducing information by making a light beam emitted from a light source incident on the information recording medium, the optical pickup unit including an electro-optical element switching values of transmittance of a given region through which the light beam passes depending on whether the information is recorded or reproduced.

According to the above-described information recording and reproduction apparatus, information recording and reproduction can be stably performed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 5:
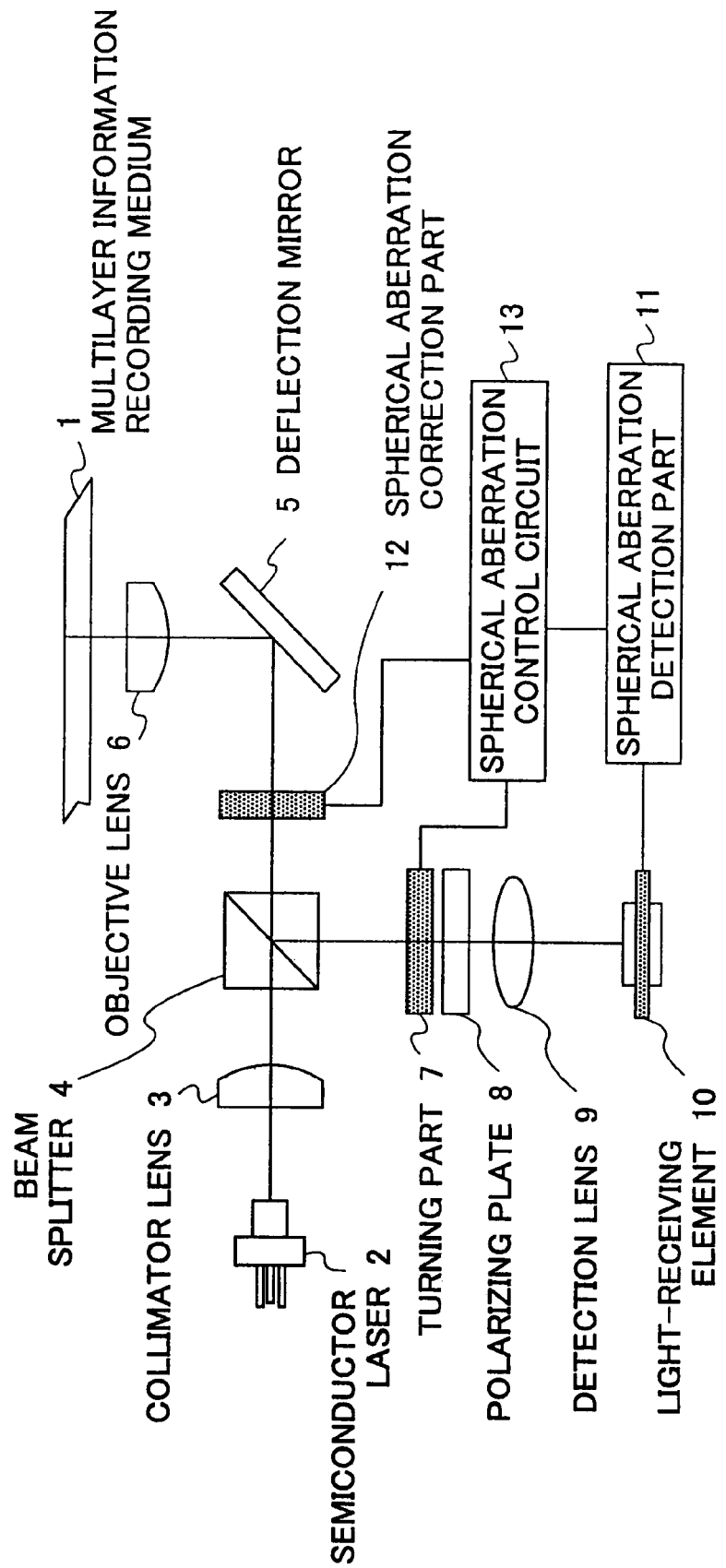
FIG. 5 is a schematic diagram showing an optical system of an optical pickup unit according to a first embodiment of the present invention.

FIG. 5 is a schematic diagram showing an optical system of an optical pickup unit according to a first embodiment of the present invention. The optical system of the optical pickup unit of FIG. 5 includes a multilayer information recording medium 1, a semiconductor laser 2 emitting a p-polarized laser beam, a collimator lens 3 collimates the laser beam emitted from the semiconductor laser 2 into parallel rays, a beam splitter 4 letting through the laser beam from the collimator lens 3 and deflecting a reflected light from the multilayer information recording medium 1, a deflection mirror 5 deflecting the laser beam, an objective lens 6 gathering the laser beam incident thereon with its optical characteristics such as numerical aperture and spherical aberration being optimized for one of the layers of the multilayer information recording medium 1, a turning part 7 that selectively turns the plane of polarization of the reflected light from the multilayer information recording medium 1 deflected by the beam splitter 4, a polarizing plate 8 transmitting the p-polarized reflected light, a detection lens 9 gathering the reflected light from the polarizing plate 8, a light-receiving element 10 receiving the reflected light to output a tracking signal, a focus signal, and a reproduction signal, a spherical aberration detection part 11 detecting spherical aberration from the output of the light-receiving element 10, a spherical aberration correction part 12, and a spherical aberration control circuit 13 driving and controlling the spherical aberration correction part 12 based on the output of the spherical aberration detection part 11.

Figure 6:
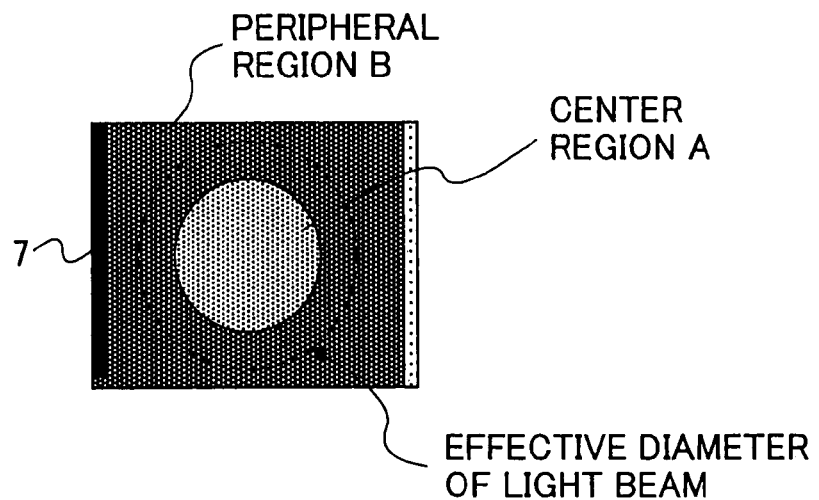
FIG. 6 is a plan view of a turning part of the optical pickup unit according to the first embodiment, showing transparent electrode patterns formed thereon.

As shown in FIG. 6, the turning part 7 is formed of a liquid crystal element composed of a central region A and a peripheral region B. Voltage is applied to a selected one of the central region A and the peripheral region B so that the direction of polarization of the light beam passing through the central region A or the peripheral region B can be changed by the applied voltage.

Figure 7:
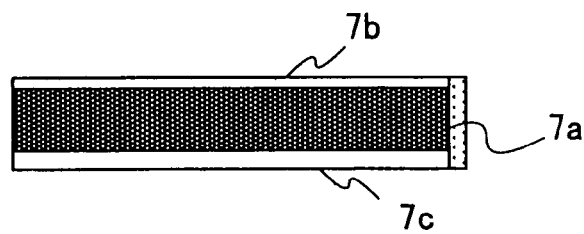
FIG. 7 is a sectional view of the turning part of FIG. 6.

As shown in FIG. 7, the turning part 7 has a twisted nematic (TN) liquid crystal 7a sandwiched, in the direction of the optical axis of the turning part 7, between two glass plates 7b and 7c with transparent electrodes. When a control voltage (control signal) of zero volts is applied (that is, no voltage is applied) between an electrode of the upper glass plate 7b (hereinafter referred to simply as an upper electrode) and an electrode of the lower glass plate 7c (hereinafter referred to simply as a lower electrode), the plane of polarization of the laser beam is turned 90° by the turning part 7. On the other hand, when a voltage higher than a threshold voltage, such as a control voltage (control signal) of five volts, is applied between the upper and lower electrodes, the laser beam passes through the turning part 7 as it is without its plane of polarization being turned.

Next, a description will be given of an operation of the turning part 7.

First, a voltage higher than the threshold voltage is applied between the upper and lower electrodes of the central region A of the turning part 7, while a voltage of zero volts is applied to the peripheral region B. Thereby, the light beam passing through the turning part 7 has its plane of polarization remaining unchanged in its part passing through the central region A and turned 90° in its part passing through the peripheral region B. Under this setting condition, the p-polarized laser beam is emitted from the semiconductor laser 2 and reflected from the multilayer information recording medium 1 to be incident on the turning part 7 through the beam splitter 4.

Since the voltage higher than the threshold voltage is applied to the central region A, the light beam passes through the central region A to remain p-polarized with its plane of polarization remaining unchanged. On the other hand, since the voltage of zero volts is applied to the peripheral region B, the light beam has its plane of polarization turned by 90° in the peripheral region B so that an s-polarized light is emitted therefrom. Thereafter, the laser beam is incident on the polarizing plate 8. Since the polarizing plate 8 lets through a p-polarized light, the laser beam from the central region A of the turning part 7 passes through the polarizing plate 8, while the s-polarized light beam from the peripheral region B of the turning part 7 is prevented from passing through the polarizing plate 8.

That is, the laser beam from the central region A of the turning part 7 passes through the polarizing plate 8 as it is to be incident on the detection lens 9, but the laser beam from the peripheral region B of the turning part 7 is blocked off by the polarizing plate 8 and is not incident on the detection lens 9. The laser beam from the central region A of the turning part 7 is collected by the detection lens 9 to be received by the light-receiving element 10 so that a focus position is output from the light-receiving element 10.

Next, the voltage applied to the central region A and the voltage applied to the peripheral region B are switched so that the voltage of zero volts is applied between the upper and lower electrodes of the central region A and the voltage higher than the threshold voltage is applied to the peripheral region B. In this case, contrary to the previous case where the voltage higher than the threshold voltage is applied to the central region A and the voltage of zero volts is applied to the peripheral region B, the laser beam from the peripheral region B of the turning part 7 is incident on the light-receiving element 10. A focus position is output from the light-receiving element 10 based on the incident light beam.

The signals of focus position (focus position signals) output from the light-receiving element 10 are input to the spherical aberration detection part 11. The spherical aberration detection part 11 obtains a difference between the focus position signals output from the light-receiving element before and after the switching of the voltages applied to the turning part 7. The spherical aberration detection part 11 outputs the difference to the spherical aberration control circuit 13.

Here, spherical aberration is a phenomenon that the focus position of rays around the axis of a beam spot (paraxial rays) is different from the focus position of rays of the peripheral part of the beam spot (marginal rays). Therefore, an amount of spherical aberration can be obtained from a difference between the focus positions by detecting the focus positions individually by separating the paraxial rays from the marginal rays. According to the first embodiment, the spherical aberration detection part 11 is capable of detecting the focus positions of the two light beams separately. The spherical aberration control circuit 13 generates a control signal proportional to the amount of spherical aberration based on the difference between the two focus positions. The spherical aberration control circuit 13 drives and controls the spherical aberration correction part 12 based on the control signal so that the spherical aberration is corrected.

Next, a more detailed description will be given of the spherical aberration correction part 12.

Figure 8:
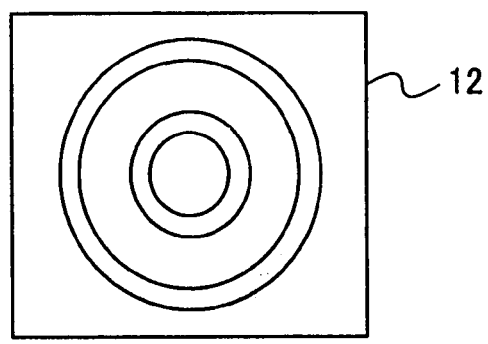
FIG. 8 is a plan view of a spherical aberration correction part of the optical pickup unit according to the first embodiment, showing transparent electrode patterns formed thereon.

The spherical aberration correction part 12 includes two glass substrates with transparent electrodes and liquid crystal molecules sandwiched between the glass substrates. An upper one of the two glass substrates (hereinafter, an upper glass substrate) has concentric electrode patterns formed thereon of transparent electrodes as shown in FIG. 8. Electrodes are formed on a lower one of the two glass substrates (hereinafter, a lower glass substrate) so as to oppose the concentric electrode patterns formed on the upper glass substrate. The concentric transparent electrode patterns may be formed on the lower glass substrate instead of the upper glass substrate.

When driving voltages are applied to the transparent electrodes, the liquid crystal molecules are aligned in accordance with electric fields generated by the applied voltages. Thereby, a refractive index distribution can be set as desired in a section of the light beam passing through the spherical aberration correction part 12 which section is perpendicular to a direction in which the light beam travels. Accordingly, the wave surface of the light beam can be divided into regions so that the phase of the wave surface can be controlled independently in each divided region. That is, the spherical aberration correction part 12 is employable for changing a refractive index.

Therefore, by variably controlling the voltage applied to each of the transparent electrode patterns formed on the upper or lower glass substrate, spherical aberration caused by a distance or an interlayer thickness between the recording layer for which the optical pickup unit is optimized and a recording layer from which information is to be reproduced can be corrected. Thereby, an optical pickup unit automatically correcting spherical aberration can be realized.

Next, a description will be given, with reference to FIGS. 9A through 9G, of correction of spherical aberration in an information recording and reproduction apparatus including the optical pickup unit of the first embodiment. In each of FIGS. 9A through 9C, 9E, and 9F, a point O on a horizontal axis corresponds to an optical axis, and D-D' represents positions on a straight line that perpendicularly crosses the optical axis at the point O. For instance, D-D' represents the pupil surface of the objective lens. Further, a vertical axis L represents an amount of spherical aberration. FIG. 9D is a diagram showing a liquid crystal panel on which three concentrically divided electrodes 14 through 16 are formed. FIG. 9G is a diagram showing electrode patterns in the case of forming five divided electrodes on the liquid crystal panel.

Figure 9A:
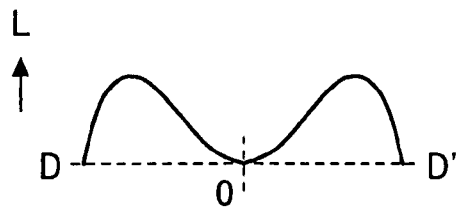
FIGS. 9A through 9G are diagrams for illustrating correction of spherical aberration in an information recording and reproduction apparatus including the optical pickup unit according to the first embodiment.

FIG. 9A is a diagram showing a distribution pattern of spherical aberration caused by the interlayer thickness between the recording layer for which the optical pickup unit is optimized and the recording layer from which information is to be reproduced. The spherical aberration shown in FIG. 9A is obtained by converting spherical aberration occurring on the recording layer into spherical aberration on the pupil surface of the objective lens by ray tracing.

Normally, the laser beam is focused into a circular beam spot so that spherical aberration varies in a radial direction. If the interlayer thickness increases, the two peaks of the spherical aberration shown in FIG. 9A become higher. In the case of occurrence of such spherical aberration, the liquid crystal panel of FIG. 9D is controlled so that voltage is applied to the electrode 15 so as to provide, as shown in FIG. 9B, a phase difference canceling the spherical aberration of FIG. 9A to a light beam passing through the part of the electrode 15, while voltages are applied to the electrodes 14 and 16 so that light beams pass through the parts of the electrodes 14 and 16 as they are without any phase differences being provided thereto.

Figure 9B:
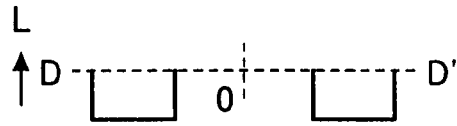
Figure 9C:
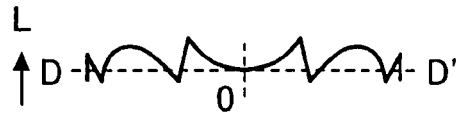
Figure 9D:
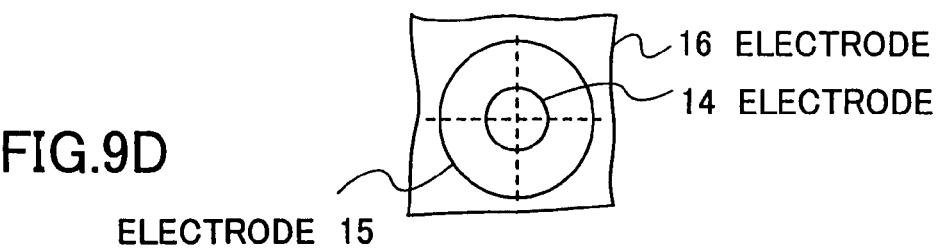
Figure 9E:
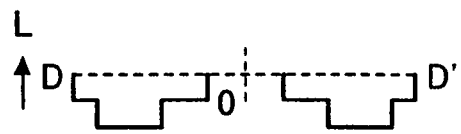
Figure 9F:
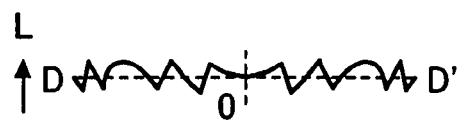
Figure 9G:
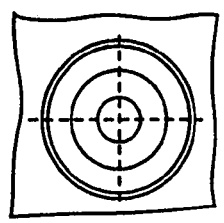

Thus, by applying the different voltages to the concentrically divided electrodes 14 through 16 formed on the liquid crystal panel, correction as shown in FIG. 9B is performed on the spherical aberration of FIG. 9A so that residual spherical aberration can be minimized as shown in FIG. 9C. Thereby, the diameter of the beam spot can be reduced. FIGS. 9E and 9F are diagrams showing a correction to the spherical aberration and the result of the correction, respectively, in the case where the five concentrically divided electrodes are formed on the liquid crystal panel as shown in FIG. 9G. By controlling the liquid crystal display of FIG. 9G so that different voltages are applied to the five divided electrodes so as to provide phases canceling the spherical aberration to light beams passing through given ones of the five electrodes as shown in FIG. 9E, a more precise correction can be made to the spherical aberration as shown in FIG. 9F. The residual spherical aberration is further reduced in FIG. 9F compared with FIG. 9C, so that the diameter of the beam spot can be further decreased.

According to the optical pickup unit thus configured according to the first embodiment, which unit employs the spherical aberration detection part 11 and the spherical aberration correction part 12, an amount of spherical aberration can be measured by the spherical aberration detection part 11 so that the peripheral region of the laser beam can be optimized by the spherical aberration correction part 12 even if the peripheral region of the laser beam is not focused on a recording surface of the multilayer information recording medium 1 by the effect of the spherical aberration in the case of reproducing information from a recording layer other than the recording layer for which the objective lens 6 of the optical pickup unit is optimized. Therefore, recording can be performed on the multilayer information recording medium 1 with high accuracy and a high-quality signal can be reproduced from the multilayer information recording medium 1. The same effects can be produced by the information recording and reproduction apparatus including the above-described optical unit according to the first embodiment.

In the optical pickup unit of FIG. 5, the turning part 7 and the polarizing plate 8 may be formed as a single unit. This reduces the number of assembly steps, thus realizing cost reduction. Further, in this case, the optical pickup unit can be further downsized by depositing a polarizing film on the turning part 7 instead of attaching the polarizing plate 8 thereto.

Further, the polarizing plate 8 of FIG. 5 may be replaced by another optical device for polarization selection, such as a polarization beam splitter or a polarization hologram.

Furthermore, the spherical aberration correction part 12 of the optical pickup unit of FIG. 5 is not limited to a liquid crystal element, which is employed in the first embodiment.

Figure 10:
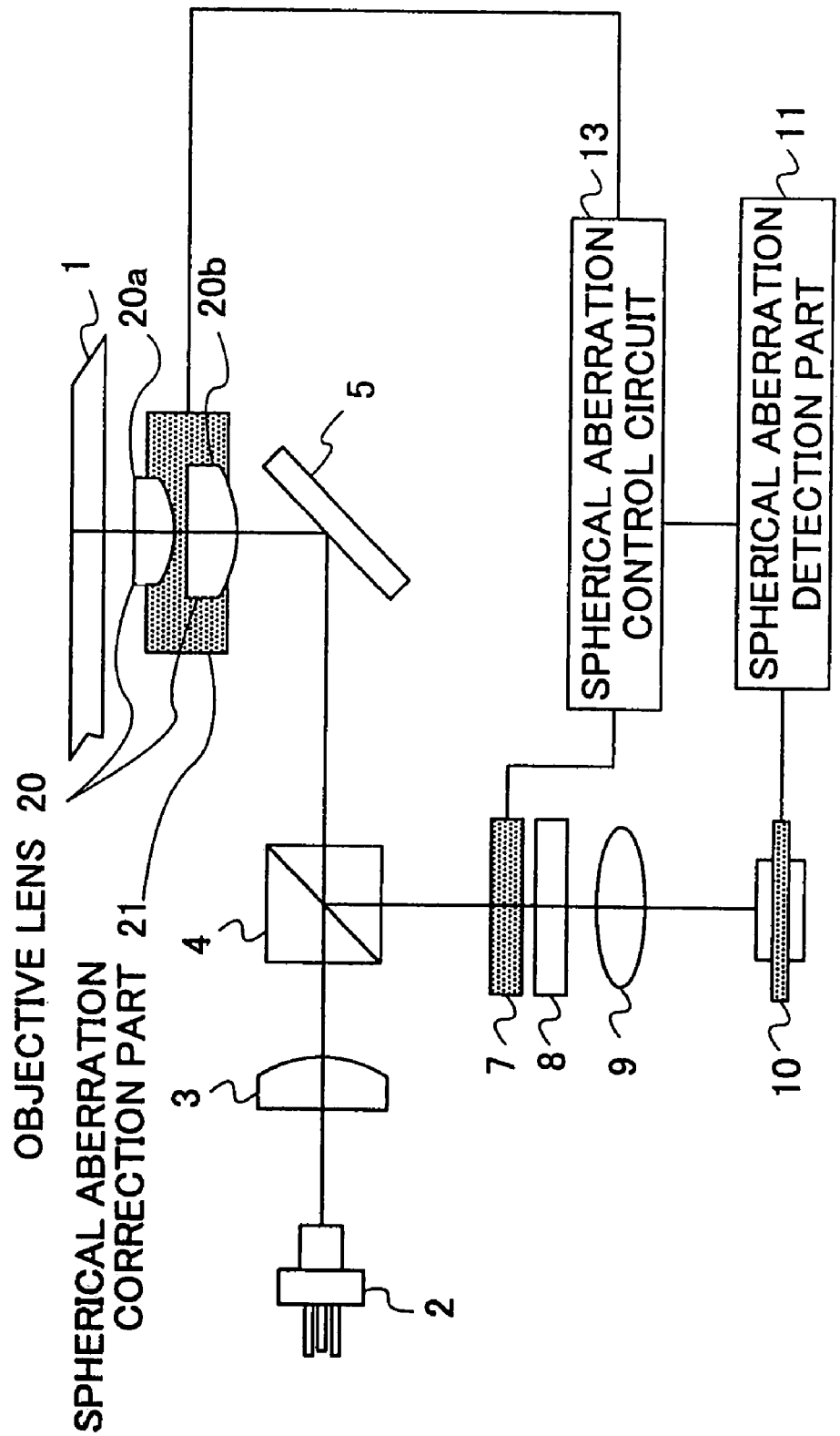
FIG. 10 is a diagram for illustrating a configuration of the optical pickup unit of the first embodiment in which another spherical aberration correction element is employed.

FIG. 10 is a diagram for illustrating a configuration of the optical pickup unit of the first embodiment in which a movable lens is employed to perform spherical aberration correction.

The optical pickup unit of FIG. 10 includes an objective lens 20 and a spherical aberration correction part 21. In FIG. 10, the same elements as those of FIG. 5 are referred to by the same numerals, and a description thereof will be omitted.

In the configuration of FIG. 10, the objective lens 20 composed of two aspherical lenses 20a and 20b replaces the objective lens 6 of FIG. 5, and the spherical aberration correction part 21 having a distance adjustment mechanism varying a distance between the aspherical lenses 20a and 20b replaces the spherical aberration correction part 12 of FIG. 5. The distance adjustment mechanism of the spherical aberration correction part 21 is provided between the aspherical lenses 20a and 20b.

A piezoelectric element is applicable as the distance adjustment mechanism. The distance between the aspherical lenses 20a and 20b becomes greater by applying a higher voltage to the piezoelectric element and smaller by applying a lower voltage thereto. Spherical aberration can be corrected by generating such a variation in voltage based on the output of the spherical aberration detection part 11.

According to the configuration of FIG. 10, spherical aberration on an information recording layer can be reduced so that the optical pickup unit has good recording and reproduction characteristics.

In the optical pickup unit of FIG. 10, an electromagnetically driven actuator or motor may be used as the distance adjustment mechanism instead of the piezoelectric element. An actuator driven by ultrasonic waves is also employable instead of the piezoelectric element. Further, a group of two convex lenses or a combination of an aspherical lens and a spherical lens may be employed as the objective lens 20 instead of the two aspherical lenses 20a and 20b.

Figure 11:
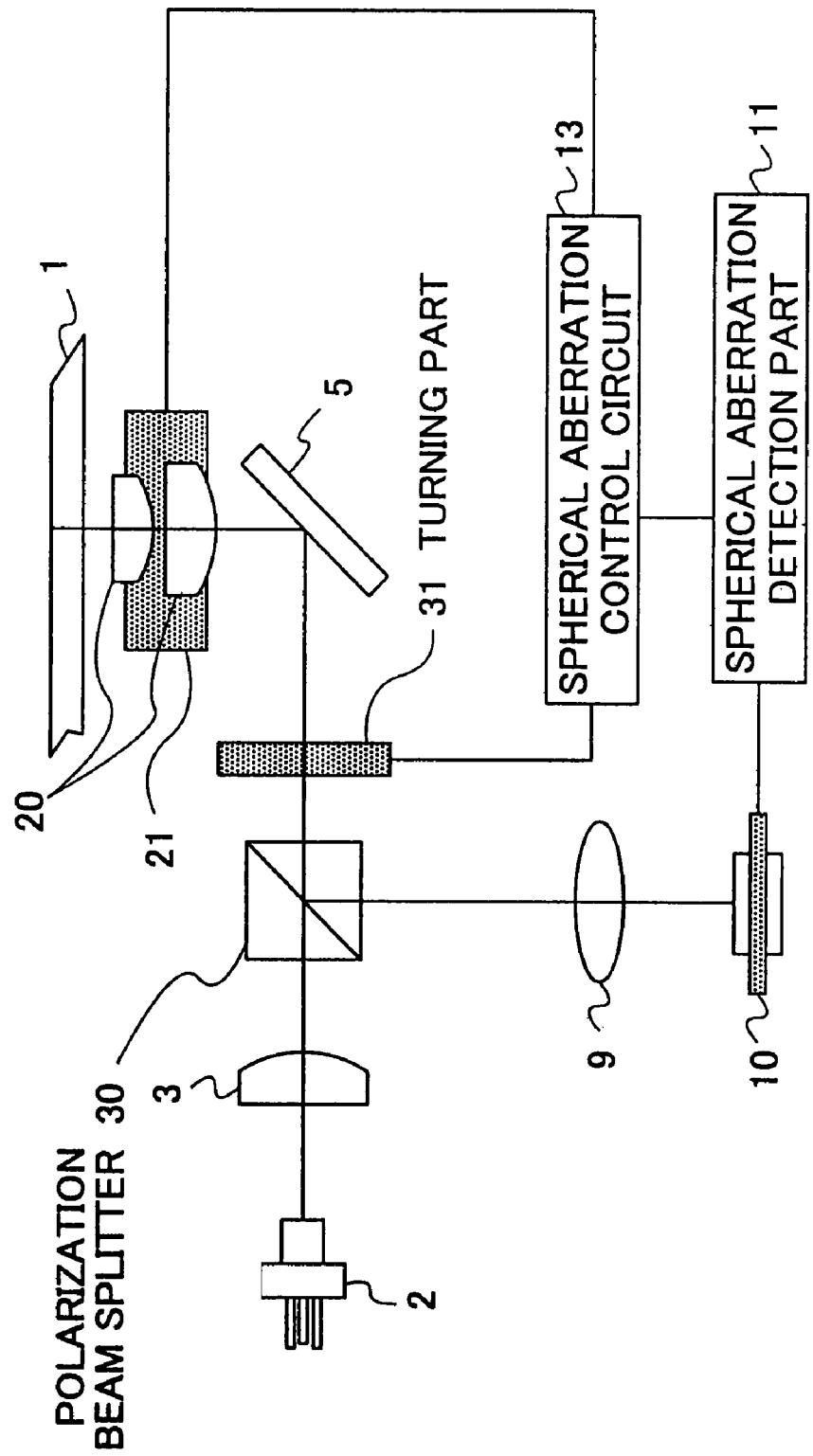
FIG. 11 is a schematic diagram showing a configuration of an optical system of an optical pickup unit according to a second embodiment of the present invention.

FIG. 11 is a schematic diagram showing a configuration of an optical system of an optical pickup unit according to a second embodiment of the present invention. The optical pickup unit of FIG. 11 includes a polarization beam splitter 30 and a turning part 31. In FIG. 11, the same elements as those of FIGS. 5 and 10 are referred to by the same numerals, and a description thereof will be omitted.

The optical pickup unit of the second embodiment is different from that of the first embodiment in the following points:

(a) The polarization beam splitter 30 replaces the beam splitter 4 of the first embodiment.

(b) The turning part 31, which replaces the turning part 7 of the first embodiment, is provided in the optical path between the polarization beam splitter 30 and the objective lens 20.

(c) The turning part 31 includes a functional element corresponding to a ¼ wave plate, while the turning part 7 of the first embodiment is employed as a functional element corresponding to a ½ wave plate (that is, the turning part 7 turns a plane of polarization 90° when the voltage is applied to the turning part 7, and does not turn the plane of polarization when no voltage is applied thereto).

(d) The polarizing plate 8 of the first embodiment is not employed in the second embodiment.

The ¼ wave plate circularly polarizes the linearly polarized laser beam emitted from the semiconductor laser 2 so that the circularly polarized light beam is incident on the multilayer information recording medium 1. On the other hand, the ¼ wave plate linearly polarizes a reflected light beam from the multilayer information recording medium 1, which light beam is circularly polarized in the reverse direction, into a light beam whose plane of polarization is perpendicular to that of the light beam emitted from the semiconductor laser 2 toward the multilayer information recording medium 1. Unlike the non-polarization beam splitter 4 of the first embodiment, the polarization beam splitter 30 is a polarizing element of '1'/'0' that transmits a p-polarized laser beam and reflects an s-polarized laser beam. The second embodiment employs the same components as the first embodiment except those mentioned above.

Like the configuration shown in FIG. 6, the turning part 31 is formed of a liquid crystal element composed of the central region A and the peripheral region B. Voltage is applied to a selected one of the central region A and the peripheral region B so that the state of polarization of the light beam passing through the central region A or the peripheral region B may be changed by the applied voltage.

Like the configuration of FIG. 7, the turning part 31 has a liquid crystal sandwiched, in the direction of an optical axis, between two upper and lower glass plates with transparent electrodes. When a voltage lower than a threshold voltage is applied between the upper and lower electrodes in the region A or B, the ¼ wave plate function of the turning part 31 is started so that the laser beam is emitted therefrom circularly polarized. On the other hand, when a voltage higher than the threshold voltage is applied between the upper and lower electrodes, the turning part 31 loses its refractive index anisotropy, causing no phase difference in the laser beam with $\Delta n=0$. Therefore, the laser beam passes through the turning part 31 as it is without its plane of polarization being turned.

In the case of recording information on or reproducing information from the multilayer information recording medium 1, first, the voltage higher than the threshold voltage is applied between the upper and lower electrodes of the central region A, while the voltage lower than the threshold value is applied to the peripheral region B. Thereby, the light beam passing through the turning part 31 has its plane of polarization remaining unchanged in its part passing through the central region A and circularly polarized in its part passing through the peripheral region B. Under this setting condition, the p-polarized laser beam is emitted from the semiconductor laser 2 to be incident on the turning part 31.

Since the voltage higher than the threshold voltage is applied to the central region A, the incident laser beam passes through the central region A as the p-polarized light with its plane of polarization remaining unchanged. On the other hand, since the voltage lower than the threshold voltage is applied to the peripheral region B, the laser beam has its plane of polarization being circularly polarized in the peripheral region B. The laser beam is focused onto the multilayer information recording medium 1 with its parts passing through the regions A and B being in different states of polarization. The laser beam from the central region A is reflected from the multilayer information recording medium 1 as the p-polarized light, and is again incident on the turning part 31 to pass therethrough as the p-polarized light. On the other hand, the circularly polarized laser beam from the peripheral region B is focused onto the multilayer information recording medium 1 to be reflected therefrom circularly polarized in the reverse direction. The reflected light beam is again incident on the turning part 31 to be converted into an s-polarized light having a polarization direction perpendicular to that of the light beam emitted from the semiconductor laser 2 toward the multilayer information recording medium 1. The laser beams from the central region A and the peripheral region B are incident on the polarization beam splitter 30. The polarization beam splitter 30 transmits the p-polarized light and reflects the s-polarized light. Therefore, the laser beam from the central region A of the turning part 31 passes through the polarization beam splitter 30, while the laser beam from the peripheral region B of the turning part 31 is reflected from the polarization beam splitter 30.

That is, the laser beam from the peripheral region B of the turning part 31 is incident on the detection lens 9, while the laser beam from the central region A of the turning part 31 is not. The laser beam from the peripheral region B of the turning part 31 is gathered by the detection lens 9 to be received by the light-receiving element 10 so that a focus position is output therefrom.

Next, the voltage applied to the central region A and the voltage applied to the peripheral region B are switched so that the voltage lower than the threshold voltage, that is, the voltage of zero volts, is applied between the upper and lower electrodes of the central region A and the voltage higher than the threshold voltage is applied to the peripheral region B. In this case, contrary to the previous case where the voltage higher than the threshold voltage is applied to the central region A while the voltage of zero is applied to the peripheral region B, the laser beam from the central region A of the turning part 31 is incident on the light-receiving element 10. A focus position is output from the light-receiving element 10 based on the incident light beam.

As in the first embodiment, the spherical aberration control circuit 13 drives and controls the spherical aberration correction part 21 based on an amount of spherical aberration obtained from the output focus position signals thus generated, thereby eliminating the spherical aberration. In the second embodiment, after the spherical aberration is detected, the voltage lower than the threshold voltage is applied to each of the central region A and the peripheral region B of the turning part 31 so that the turning part 31 functions as a ¼ wave plate. A system employing a combination of the ¼ wave plate and the polarization beam splitter 30 is highly advantageous in an information recording and reproduction apparatus having a recording system requiring high efficiency of use of light.

Figure 12:
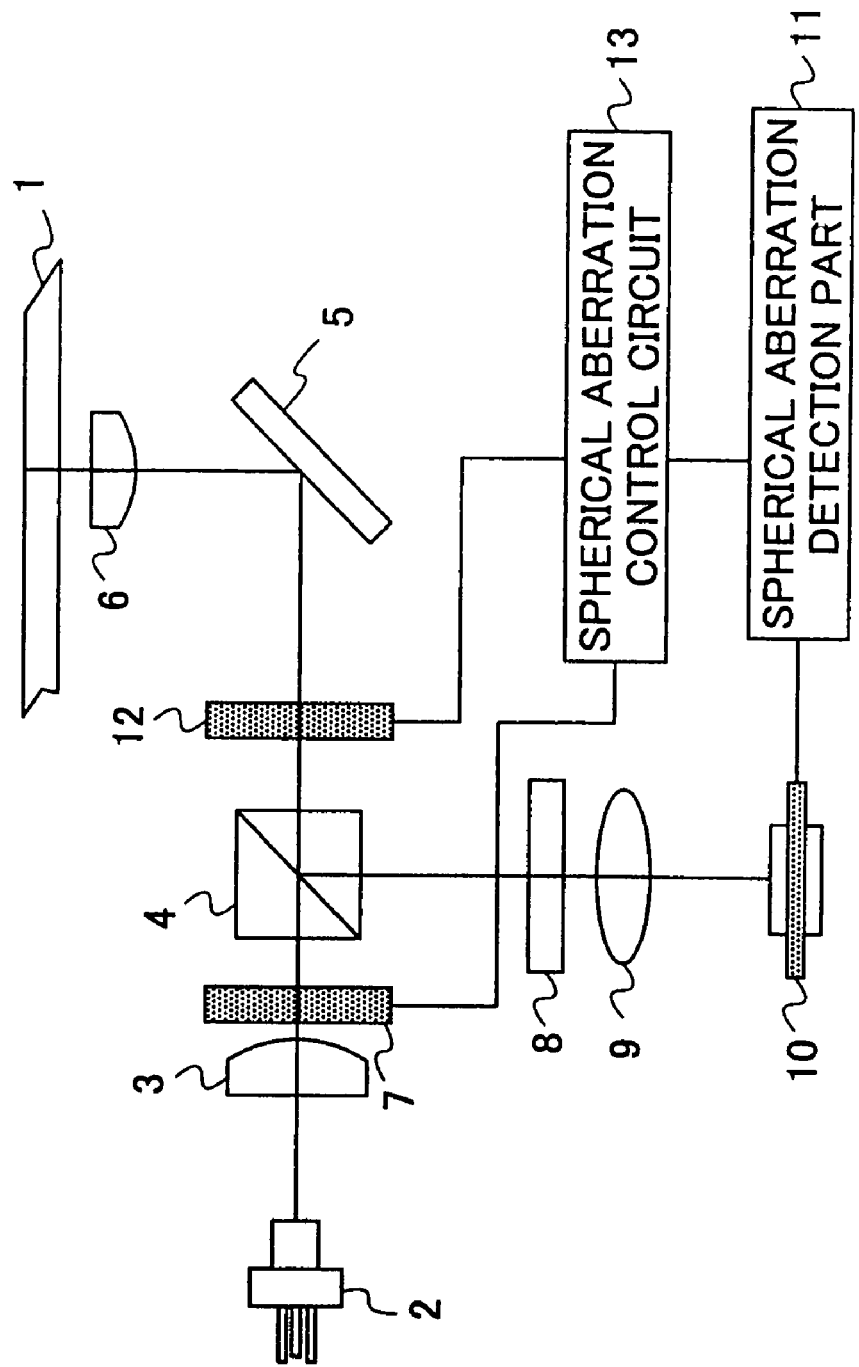
FIG. 12 is a schematic diagram showing a configuration of an optical system of an optical pickup unit according to a third embodiment of the present invention.

FIG. 12 is a schematic diagram showing a configuration of an optical system of an optical pickup unit according to a third embodiment of the present invention. In FIG. 12, the same elements as those of FIG. 5 are referred to by the same numerals, and a description thereof will be omitted.

The optical pickup unit of the third embodiment is different from that of the first embodiment in that the turning part 7 is provided in the optical path from the semiconductor laser 2 to the multilayer information recording medium 1. The turning part 7 of the third embodiment is substantially equal to that of the first embodiment. The turning part 7 of the third embodiment is identical to that of the first embodiment in being formed of the liquid crystal element composed of the central region A and the peripheral region B as shown in FIG. 6 so that voltage is applied to a selected one of the central region A and the peripheral region B, thereby changing the direction of polarization of the light beam passing through the central region A or the peripheral region B.

In the case of recording information on or reproducing information from the multilayer information recording medium 1, first, a voltage higher than a threshold voltage is applied between the upper and lower electrodes of the central region A, while a voltage of zero volts is applied to the peripheral region B. Thereby, of the light beam passing through the turning part 7, a light beam passing through the central region A has its plane of polarization remaining unchanged, while a light beam passing through the peripheral region B has its plane of polarization turned 90°. Under this setting condition, the p-polarized light beam is emitted from the semiconductor laser 2.

Since the voltage higher than the threshold voltage is applied to the central region A, the incident laser beam passes therethrough as the p-polarized light with its plane of polarization remaining unchanged. On the other hand, since the voltage of zero volts is applied to the peripheral region B, the laser beam passing therethrough has its plane of polarization turned by 90° to be emitted therefrom as an s-polarized light. Then, the laser beam passing through the turning part 7 is reflected from the multilayer information recording medium 1 and deflected by the beam splitter 4 to be incident on the polarizing plate 8. The polarizing plate 8 transmits the p-polarized reflected light. Therefore, the laser beam from the central region A of the turning part 7 passes through the polarizing plate 8, while the s-polarized laser beam from the peripheral region B of the turning part 7 is prevented from passing through the polarizing plate 8. That is, the laser beam from the central region A of the turning part 7 passes through the polarizing plate 8 as it is to be incident on the detection lens 9, while the laser beam from the peripheral region B of the turning part 7 is prevented from being incident on the detection lens 9. The laser beam from the central region A of the turning part 7 is gathered by the detection lens 9 and received by the light-receiving element 10 so that a focus position is output therefrom.

Next, the voltage applied to the central region A and the voltage applied to the peripheral region B are switched so that the voltage of zero volts is applied between the upper and lower electrodes of the central region A and the voltage higher than the threshold voltage is applied to the peripheral region B. In this case, contrary to the previous case where the voltage higher than the threshold voltage is applied to the central region A and the voltage of zero volts is applied to the peripheral region B, the laser beam from the peripheral region B of the turning part 7 is incident on the detection lens 9. A focus position is output from the light-receiving element 10 based on the incident light beam.

As in the first embodiment, the spherical aberration control circuit 13 drives and controls the spherical aberration correction part 12 based on an amount of spherical aberration obtained from the output focus position signals thus generated, thereby eliminating the spherical aberration.

Figure 13:
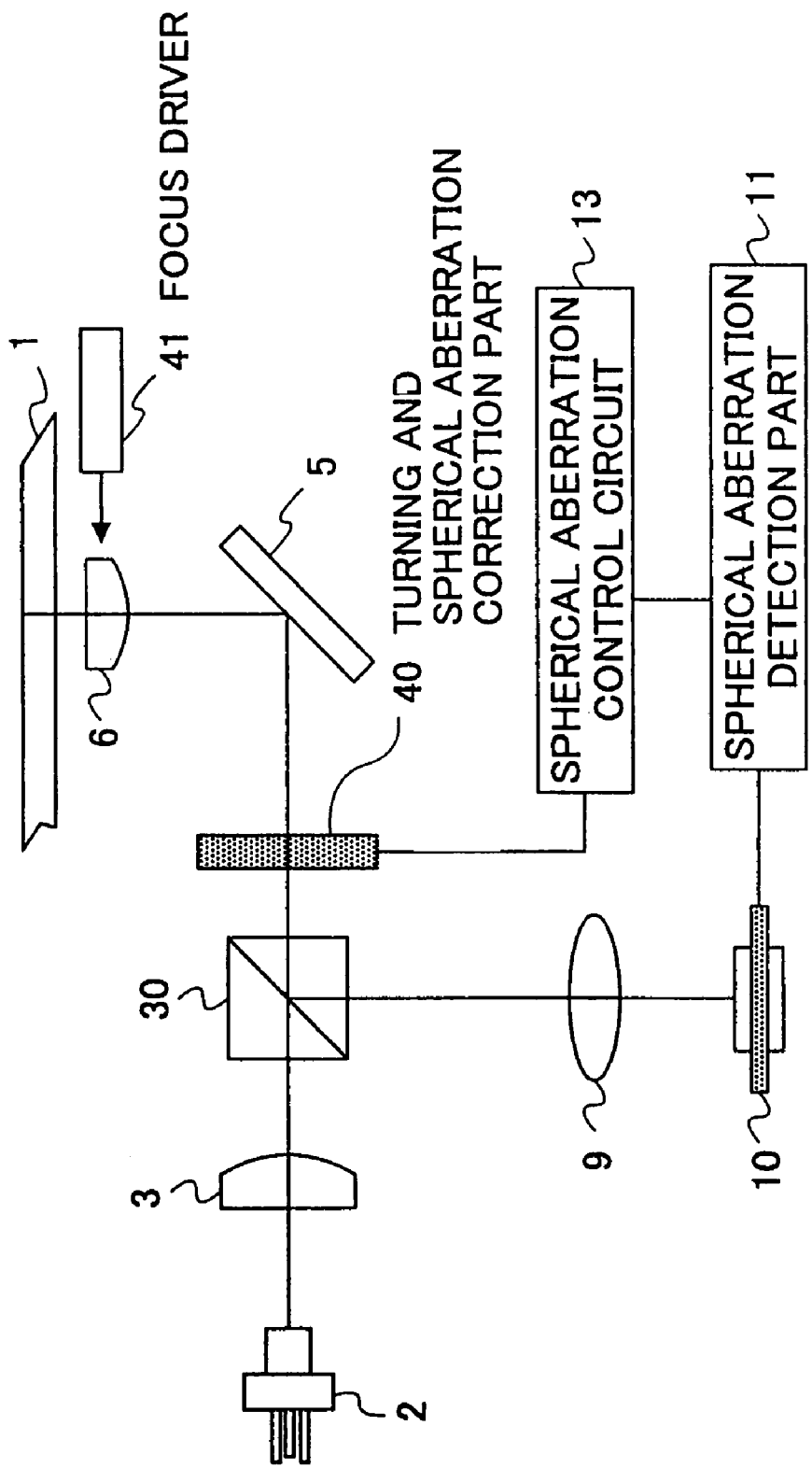
FIG. 13 is a schematic diagram showing a configuration of an optical system of an optical pickup unit according to a fourth embodiment of the present invention.

FIG. 13 is a schematic diagram showing a configuration of an optical system of an optical pickup unit according to a fourth embodiment of the present invention. The optical pickup unit of the fourth embodiment includes a turning and spherical aberration correction part 40 and a focus driver 41 that performs focus control on an actuator (not shown in the drawing) moving the objective lens 6 in focus and tracking directions.

The turning and spherical aberration correction part 40 has the glass plates 7b and 7c with the transparent electrodes and the TN liquid crystal 7a sandwiched, in the direction of the optical axis, between the glass plates 7b and 7c as shown in FIG. 7. Further, the glass plate 7b or 7c has the concentric transparent electrode patterns formed thereon. Such switching between the central region A and the spherical region B as illustrated in FIG. 6 and such selection of an amount of reduction of the beam spot diameter as illustrated in FIGS. 8 and 9A through 9G can be performed by selecting electrode patterns to which voltage are to be applied.

The multilayer information recording medium 1 is rotated by an information recording medium holding part (not shown in the drawing) and an information recording medium rotation control device (not shown in the drawing). The objective lens actuator is provided in the optical pickup unit to oppose the multilayer information recording medium 1. The objective lens actuator drives the objective lens 6 so that the laser beam is converged on a recording layer selected based on information read from the multilayer information recording medium 1 or an instruction by a user. The turning and spherical aberration correction part 40 is provided in part of the optical system including the objective lens actuator. The beam spot of the laser beam on the multilayer information recording medium 1 is optimized by driving and controlling the turning and spherical aberration correction part 40.

The objective lens actuator is driven and controlled by the focus driver 41. A focus jump signal is supplied from the control part of the objective lens actuator to the focus driver 41 based on an operation instruction in order to reproduce information from a desired recording layer.

In the process of performing focus search according to this embodiment, the spherical aberration control circuit 13 determines an amount of aberration correction by using such a method of generating a signal (spherical aberration signal) based on the difference between the focus positions of the central region A and the peripheral region B of the liquid crystal element as described in the first through third embodiments. The spherical aberration control circuit 13 supplies the amount of aberration correction corresponding to the recording layer that the information is to be recorded on or reproduced from to the turning and spherical aberration correction part 40 in the form of application of given voltages.

According to the above-described configuration, in the case of reproducing information from a desired recording layer of the multilayer information recording medium 1, an amount of aberration correction corresponding to the desired recording layer is detected and spherical aberration correction is performed by applying given voltages based on the detection signal. Further, while the turning part 7 and the spherical aberration correction part 12 are separately provided in the optical pickup unit in each of the first and third embodiments, the functions of the turning part 7 and the spherical aberration correction part 12 are realized by the single unit of the turning and spherical aberration correction part 40 having the liquid crystal having the two functions in the fourth embodiment. By thus integrating the turning part 7 and the spherical aberration correction part 12 into the single unit, the cost of components can be reduced. The number of assembly steps is also decreased so that further cost reduction can be realized. Furthermore, the optical pickup unit can be downsized.

Figure 14:
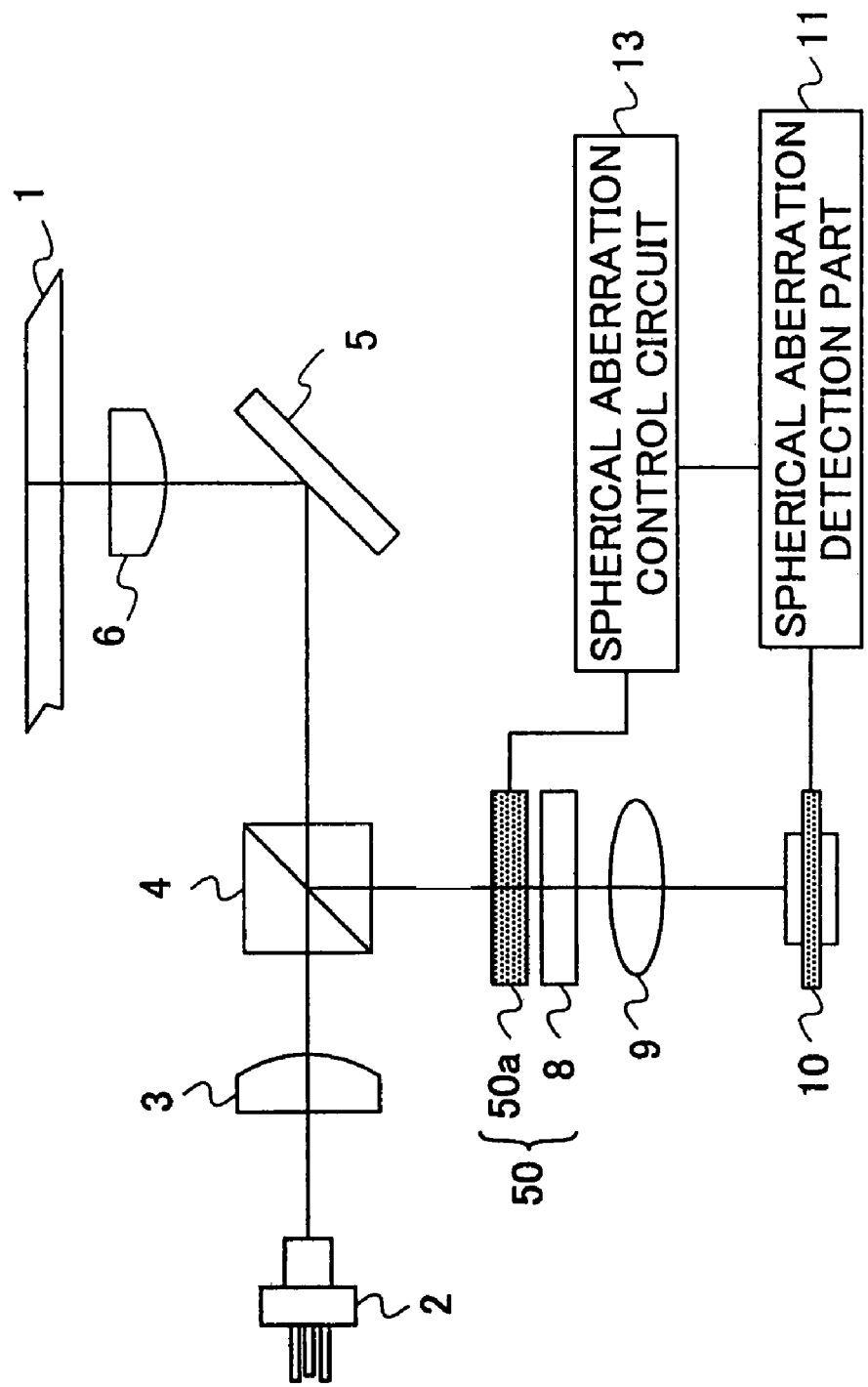
FIG. 14 is a schematic diagram showing a configuration of an optical system of an optical pickup unit according to a fifth embodiment of the present invention.

FIG. 14 is a schematic diagram showing a configuration of an optical system of an optical pickup unit according to a fifth embodiment of the present invention. The optical pickup unit of the fifth embodiment includes a turning and spherical aberration correction part 50. In FIG. 14, the same elements as those of FIGS. 5 and 10 are referred to by the same numerals, and a description thereof will be omitted.

The turning and spherical aberration correction part 50 is composed of a liquid crystal element 50a and the polarizing plate 8 for selectively transmitting or blocking off a reflected light from a recording layer of the multilayer information recording medium 1 for which recording layer the optical characteristics of the objective lens 6 are not optimized. The turning and spherical aberration correction part 50 is provided in the optical path from the beam splitter 4 and the light-receiving element 10 as a replacement for the turning part 7 and the spherical aberration correction part 12 of the first embodiment.

Transparent electrode patterns are formed concentrically on the liquid crystal 50a of the turning and spherical aberration correction part 50. Like the turning and spherical aberration correction part 40, the turning and spherical aberration correction part 50 is configured so that such switching between the central region A and the spherical region B as illustrated in FIG. 6 and such selection of an amount of reduction of the beam spot diameter as illustrated in FIGS. 8 and 9A through 9G can be performed by selecting electrode patterns to which voltages are to be applied.

First, an amount of spherical aberration for a recording layer of the multilayer information recording medium 1 for which layer the optical characteristics of the objective lens 6 are not optimized is detected by switching the voltages applied to the turning and spherical aberration correction part 50 in accordance with the process as described in the first embodiment. Then, given voltages are applied to the concentric electrode patterns based on the amount of spherical aberration so that the planes of polarization of light beams passing through the respective concentric electrode patterns are different from each other. For instance, while a constant voltage is applied to the central region of the turning and spherical aberration correction part 50, a voltage applied to the concentric spherical region thereof is changed so as to change the optical phase of the spherical region.

Then, only a laser beam of a given phase is allowed to pass through the polarizing plate 8 of the turning and spherical aberration correction part 50 to be received by the light-receiving element 10.

According to the above-described configuration, of a reflected light from a recording layer for which the optical characteristics of the objective lens 6 are not optimized, the peripheral part, which is significantly affected by spherical aberration, is prevented from being received by the light-receiving element 10. This prevents deterioration of the quality of reproduced signals.

The present invention is not limited to the specifically disclosed embodiments of the optical pickup unit of the present invention. For instance, spherical aberration is detected by separately detecting the focus positions of the central region A and the peripheral region B according to the spherical aberration method shown in the above-described embodiments. However, spherical aberration may be detected by separately detecting the focus position of the sum of the central region A and the peripheral region B and the focus position of the peripheral region B. Alternatively, the focus positions of a plurality of regions may be detected instead of those of the central region A and the peripheral region B. In such a case, a variety of combinations of the focus positions are available so that correction can be made more precisely.

Figure 15:
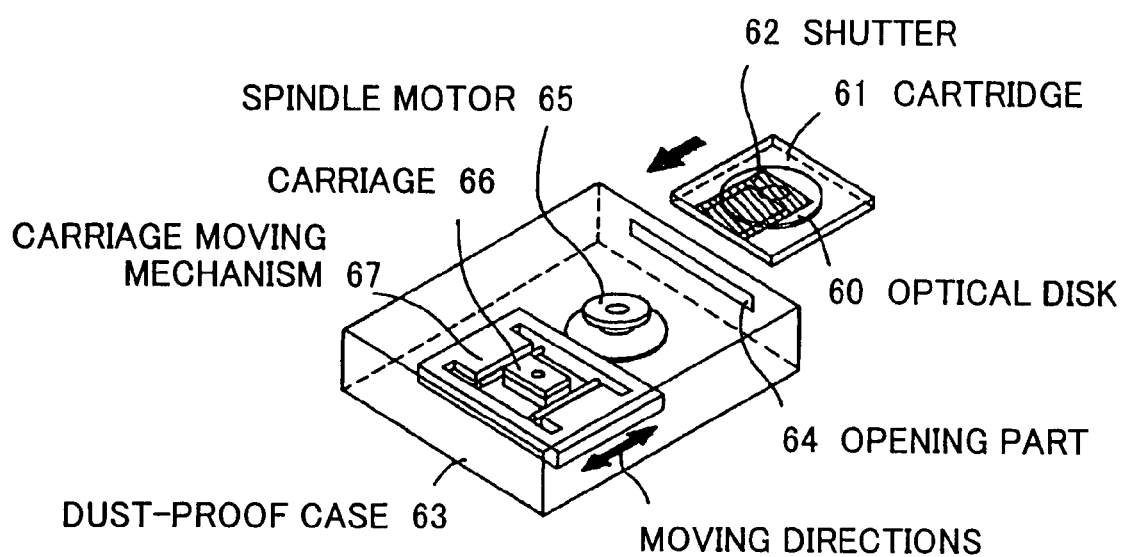
FIG. 15 is a perspective view of an information recording and reproduction apparatus according to a sixth embodiment of the present invention.

FIG. 15 is a perspective view of an information recording and reproduction apparatus according to a sixth embodiment of the present invention. The information recording and reproduction apparatus of FIG. 15 includes an optical disk 60 that is a multilayer information recording medium, a cartridge 61 accommodating the optical disk 60, a shutter 62 provided to the cartridge 61 to be openable (and closable) so that the recording surface may be exposed externally, a dust-proof case 63. serving as the exterior of the information recording and reproduction apparatus, an opening part 64 formed on the dust-proof case 63 so that the cartridge 61 is inserted thereinto or extracted therefrom through the opening part 64, a spindle motor 65 rotating the optical disk 60, a carriage 66 provided with an optical pickup unit, and a carriage moving mechanism 67 moving the carriage 66 in the radial direction of the optical disk 60.

In FIG. 15, a variety of signal processing circuits and input and output terminals, which are practically necessary components in the information recording and reproduction apparatus, are not shown.

The optical pickup unit supported on the carriage 66 is any of the optical pickup units of FIGS. 5 and 10 through 14. Information is recorded on or reproduced from the optical disk 60 by this optical pickup unit.

The information recording and reproduction apparatus is thus configured so as to be capable of recording information on and reproducing information from a multilayer information recording medium.

Figure 16:
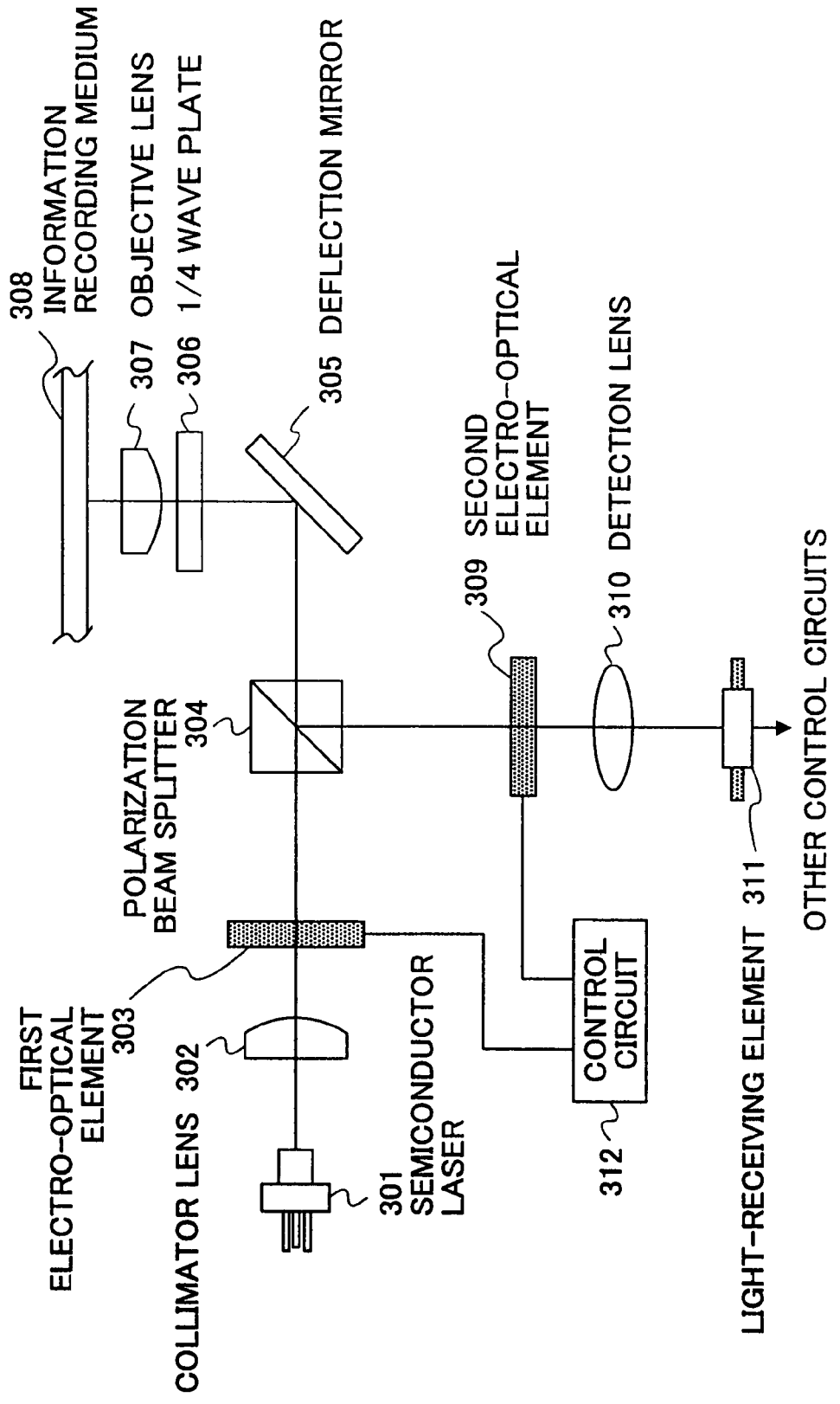
FIG. 16 is a schematic diagram showing a configuration of an optical system of an optical pickup unit according to a seventh embodiment of the present invention.

FIG. 16 is a schematic diagram showing a configuration of an optical system of an optical pickup unit according to a seventh embodiment of the present invention. The optical pickup unit of FIG. 16 includes a semiconductor laser 301 that is a light source, a collimator lens 302, a first electro-optical element 303 having a transmittance change region and an aberration correction region, a polarization beam splitter 304, a deflection mirror 305, a ¼ wave plate 306, an objective lens 307, a second electro-optical element 309 having a transmittance change region and an aberration detection signal generation region, a detection lens 310, a light-receiving element 311 that is an element detecting a light beam, and a control circuit 312 controlling the first and second electro-optical elements 303 and 309.

As shown in FIG. 16, a light beam emitted from the semiconductor laser 301 is converted into substantially parallel rays by the collimator lens 302 to be incident on the first electro-optical element 303 provided behind (subsequent to) the semiconductor laser 301 in the optical path between the semiconductor laser 301 and an information recording medium 308. As will be described later, the first electro-optical element 303 is composed of a first region that is the transmittance change region switching a transmittance for recording information on the information recording medium 308 and a transmittance for reproducing information therefrom and a second region that is the aberration correction region performing aberration correction by providing the light beam passing therethrough with a phase reverse to the wavefront aberration of the light beam. The light beam passing through the first electro-optical element 303 passes through the polarization beam splitter 304 to have its optical path deflected 90° by the deflection mirror 305. Thereafter, the light beam is collected by the objective lens 307. The ¼ wave plate 306 is provided between the deflection mirror 305 and the objective lens 307. The ¼ wave plate 306 coverts the light beam from a linearly polarized light to a circularly polarized light so that the light beam is focused onto the information recording medium 308 circularly polarized.

The reflected light beam from the information recording medium 308 travels through the optical path of the emitted light beam in the opposite direction to again reach the polarization beam splitter 304 via the objective lens 307, the ¼ wave plate 306, and the deflection mirror 305. The light beam reflected from the information recording medium 308 to be incident on the ¼ wave plate is circularly polarized in a reverse direction compared with the light beam emitted from the ¼ wave plate 306 toward the information recording medium 308. The reflected light beam passes through the ¼ wave plate 306 to be converted into a linearly polarized light whose plane of polarization is perpendicular to that of the linearly polarized light beam emitted from the semiconductor laser 301. The linearly polarized reflected light beam is reflected from the polarization beam splitter 304, which transmits the light beam emitted from the semiconductor laser 301. The reflected light beam reflected from the polarization beam splitter 304 is incident on the second electro-optical element 309 provided in front of (preceding) the light-receiving element 311 in the optical path between the information recording medium 308 and the light-receiving element 311. As will be described later, the second electro-optical element 309 is composed of a third region that is the transmittance change region changing its transmittance at the time of recording and reproduction depending on the type of the information recording medium 8 and a fourth region that is the aberration detection signal generation region switching ON or OFF transmittance for the light beam passing therethrough in order to generate an aberration detection signal.

The light beam passing through the second electro-optical element 309 passes through the detection lens 310 to reach the light-receiving element 311. The light-receiving element is suitably divided in accordance with a servo signal generation method. The reflected light from the information recording medium 308 is detected by the light-receiving element 311 to be output to other succeeding control circuits (not shown in the drawing) as a tracking signal, a focus signal, and a reproduction signal.

In the conventional optical pickup unit, at a time of recording information on (writing information to) an information recording medium, the output of a semiconductor laser, which is set to a high level, is hardly affected by a returning light. On the other hand, at a time of reproducing (reading) information from the information recording medium, the output of the semiconductor laser is set to a low level. Therefore, the output of the semiconductor laser is subject to the effect of the returning light in the conventional optical pickup unit.

According to the configuration of the present invention, compared with the conventional configuration, the output of the semiconductor laser 301 can be increased at the time of reproduction so that the semiconductor laser 301 can emit light with power a few milliwatts greater than the threshold current level without changing the amount of light reaching the information recording medium 308. By performing such control, the output of the semiconductor laser 301 can be set to a level higher than the conventional level at the time of reproduction, so that the semiconductor laser 301 is less affected by the returning light. Further, by setting the transmittance of the first electro-optical element 303 to a low rate (value), a rate of returning light to the semiconductor laser 301 is reduced, so that the light emission of the semiconductor laser 1 is stabilized and noise in the output of the semiconductor laser 301 is reduced.

Figure 17:
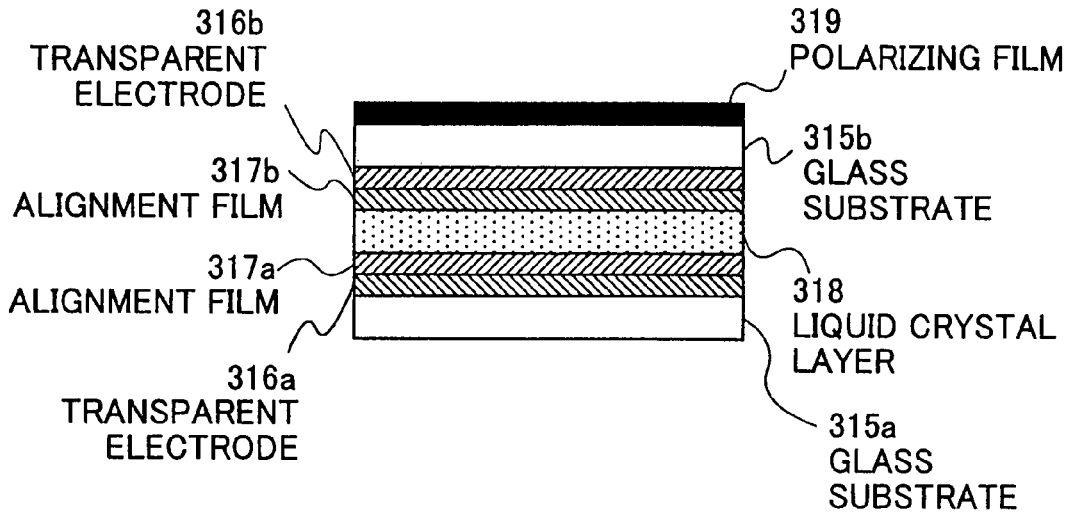
FIG. 17 is a sectional view of a first electro-optical element (liquid crystal cell) of the optical pickup unit of FIG. 16.

FIG. 17 is a sectional view of the first electro-optical element 303. The first electro-optical element 303 includes a pair of glass substrates 315*a* and 315*b*. Transparent electrodes 316*a* and 316*b* are formed of ITO ($In_2O_3.SnO_2$) on the glass substrates 315*a* and 315*b*, respectively. Polyimide alignment films 317*a* and 317*b*, which have been subjected to alignment processing by rubbing, are formed on the ITO transparent electrodes 316*a* and 316*b*, respectively.

A gap material (not shown in the drawing) is provided between the paired glass substrates 315*a* and 315*b* so that the paired glass substrates 315*a* and 315*b* oppose each other with a given distance therebetween. A space between the paired glass substrates 315*a* and 315*b* is sealed with a seal material (not shown in the drawing). A given liquid crystal is sealed into the space so as to form a liquid crystal layer 318.

The first electro-optical element 303 is formed as a liquid crystal cell. In this liquid crystal cell, the alignment of liquid crystal molecules in the liquid crystal layer 318 is continuously twisted 90° between the lower and upper alignment layers 317*a* and 317*b* when alignment processing is performed so that the lower and upper alignment films 317*a* and 317*b* are 90° different in directions in which the longitudinal axes of liquid crystal molecules are aligned, that is, when the lower and upper alignment films 317*a* and 317*b* are rubbed in directions 90° different from each other. Further, as shown in FIG. 17, a polarizing film 319, for instance, is deposited on the liquid crystal cell on the side opposite to the semiconductor laser 301 opposing the liquid crystal cell so as to cover a region corresponding to the transmittance change region. The polarizing film 319 is provided so that its polarization axis coincides with the direction of alignment of liquid crystal molecules on the surface of the adjacent glass substrate 315*b*.

Figure 18:
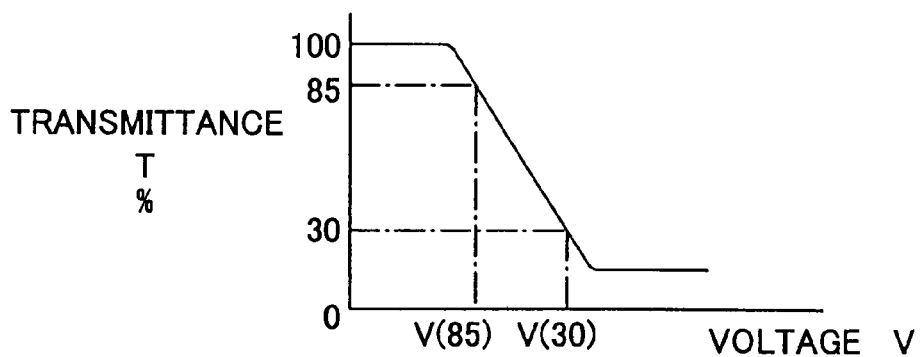
FIG. 18 is a diagram showing a relationship between transmittance and applied voltage in the liquid crystal cell of FIG. 17.

According to this arrangement, a relationship between a voltage V applied to the liquid crystal cell and its transmittance T is as shown in FIG. 18. That is, when a low voltage is applied to the liquid crystal cell, the plane of polarization of the light beam emitted from the semiconductor laser 301 to be incident on the liquid crystal cell is turned 90° in accordance with the twist of the liquid crystal molecules to be absorbed into the polarizing film 319.

That is, in the case of applying a low voltage to the liquid crystal cell, transmittance for the light beam emitted from the semiconductor laser 301 is controlled to a low rate (value). On the other hand, when a high voltage is applied to the liquid crystal cell, the twist of the alignment of the liquid crystal molecules disappears. As a result, the light beam emitted from the semiconductor laser 301 and incident on the liquid crystal cell travels straight without its plane of polarization being turned to pass through the polarizing film 319. That is, in the case of applying a high voltage to the liquid crystal cell, the light beam emitted from the semiconductor laser 301 is controlled to a high rate (value).

In the case of employing this liquid crystal cell, which can perform such transmittance control, as the first electro-optical element 303 in the optical pickup unit, the light-emission power of the semiconductor laser 301 is set to 35 mW and the transmittance of the first electro-optical element 303 is set to 85% at the time of recording, for instance, so that the optical system may have a usability of light of 40% with respect to the light beam traveling up to the information recording medium 308. Therefore, the recording power of the light beam can be set to approximately 12 mW on the information recording medium 308.

On the other hand, at the time of reproduction, the light-emission power of the semiconductor laser 301 can be set to eight milliwatts with the transmittance of the first electro-optical element 303 being set to a low rate, for instance, 30%. In this case, the reproduction power of the light beam passing through the same optical system as at the time of recording can be set to approximately one milliwatt on the information recording medium 308.

As previously described, the semiconductor laser 301 is considerably affected by the returning light while its light-emission power is in the range up to approximately five milliwatts. According to the present invention, however, the semiconductor laser 301 is allowed to emit the light beam with a sufficient light-emission power of, for instance, eight milliwatts at the time of reproduction. Therefore, noise effects can be avoided without employing a high-frequency superimposed circuit.

Figure 19:
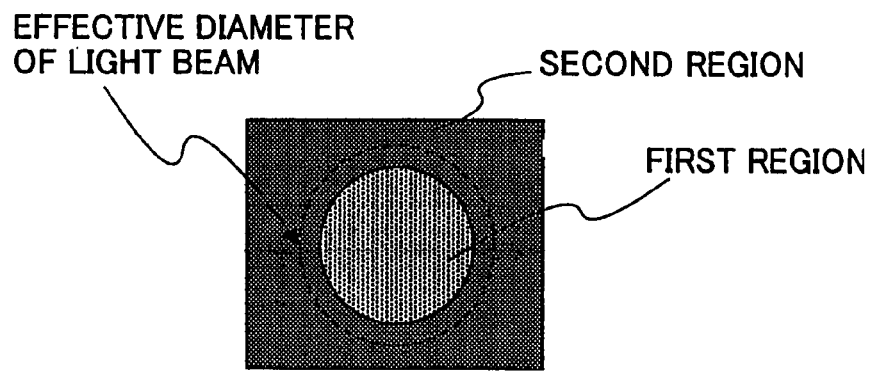
FIG. 19 is a diagram showing a transmittance change region (a first region) and an aberration correction region (a second region) of the first electro-optical element of FIG. 17.

As shown in FIG. 19, the electro-optical element 303 has the aberration correction region for correcting wavefront aberration (the second region) provided outside the transmittance change region (the first region). In the second region, at least one of the transparent electrodes 16*a* and 16*b* of the electro-optical element 303 is divided according to a given pattern. A voltage applied to each divided electrode part is variably controlled based on the later-described aberration detection signal so that the refractive index of each divided part is changed to provide a phase difference to a light beam (part of the light beam) passing through the divided part. Thereby, the wavefront aberration including coma and spherical aberration of the objective lens 307 can be corrected. That is, by controlling the voltages applied to the divided second region, the refractive index n of the liquid crystal of each divided part of the second region can be varied freely from n1 to n2.

The fact that the refractive index n is variable means that the light beam passing through each divided part of the second region can be provided with an optical path difference $\Delta n \cdot d$ ($\Delta n$ is a variation of the refractive index and d is a liquid crystal cell thickness), that is, a phase difference $\Delta n \cdot d (2\pi/\lambda)$ ($\lambda$ is the wavelength of the light beam). Thus, by controlling the applied voltages in accordance with wavefront aberration occurring in the objective lens 307 so as to change the refractive index n of each divided part of the second region, wavefront aberration caused by the objective lens 307 can be corrected.

Figure 20A:
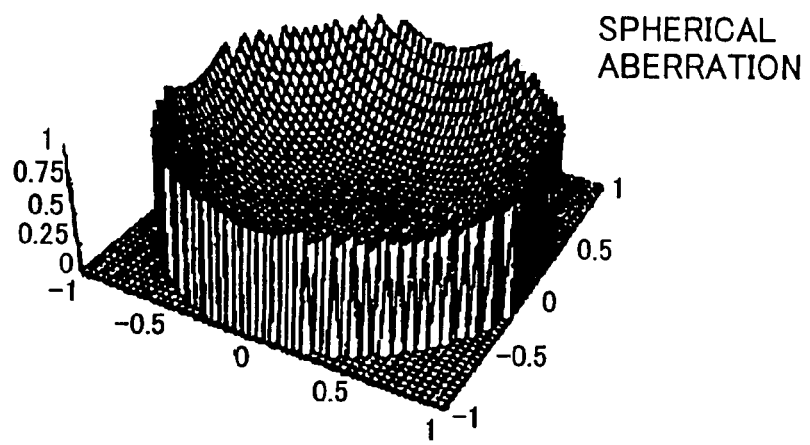
FIGS. 20A through 20C are diagrams showing spherical aberration, coma, and astigmatism, respectively.
Figure 20B:
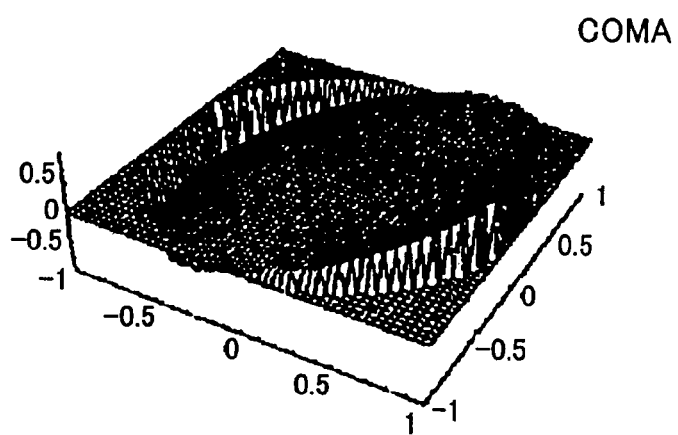
Figure 20C:
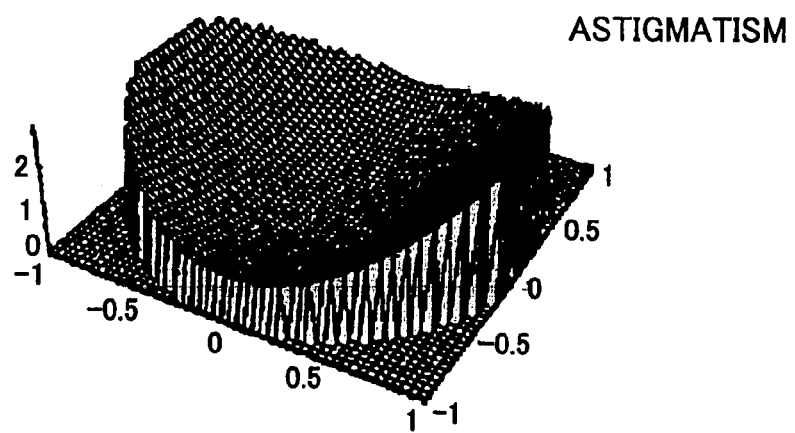

FIGS. 20A through 20C are diagrams showing typical types of wavefront aberration. FIGS. 20A through 20C show spherical aberration, coma, and astigmatism, respectively. As is apparent from FIGS. 20A through 20C, the peripheral part of a light beam passing through an objective lens is significantly affected by wavefront aberration, while a returning light affects the central region of the light beam, where the power of the light beam is high. Thus, stable control of the semiconductor laser 301 and correction of the wavefront aberration of the light beam incident on the objective lens 307 can be performed compatibly by the single electro-optical element 303 by dividing the region thereof.

Further, in the optical pickup unit of FIG. 16, the intensity of the light beam (signal light) incident on the light-receiving element 311 is extremely high at the time of recording information on the information recording medium 308 since the output power of the semiconductor laser 301 is set to a high level. On the other hand, at the time of reproducing information from the information recording medium 308, the output power of the semiconductor laser 301 is set to a low level so that the intensity of the light beam is low. Recently, there have been a plurality of types of recording media that are employable as the information recording medium 308, such as a ROM medium, a write-once medium, and a phase-change medium. Reflectivity is different in each type of recording medium. Thus, an optimum signal level differs depending on an operation (that is, whether recording or reproduction is performed) or a medium type.

Figure 1:
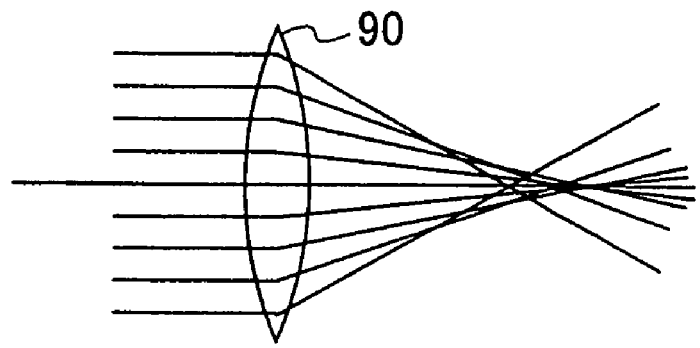
FIG. 1 is a diagram for illustrating spherical aberration.
Figure 2:
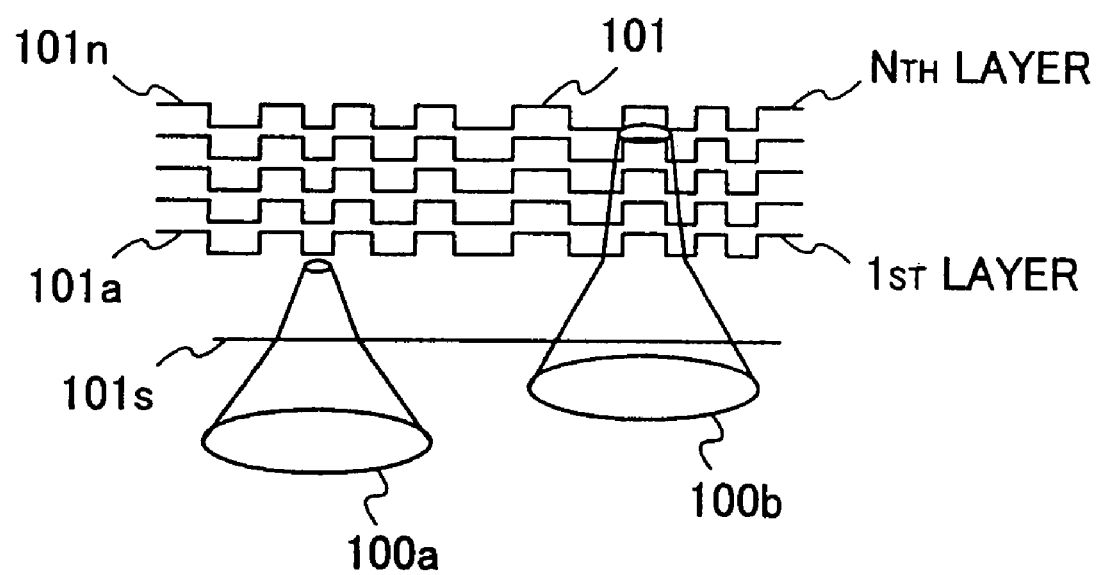
FIG. 2 is a diagram for illustrating focusing of a light beam in a case of reproducing information from a multilayer disk by a single conventional optical pickup unit.
Figure 3:
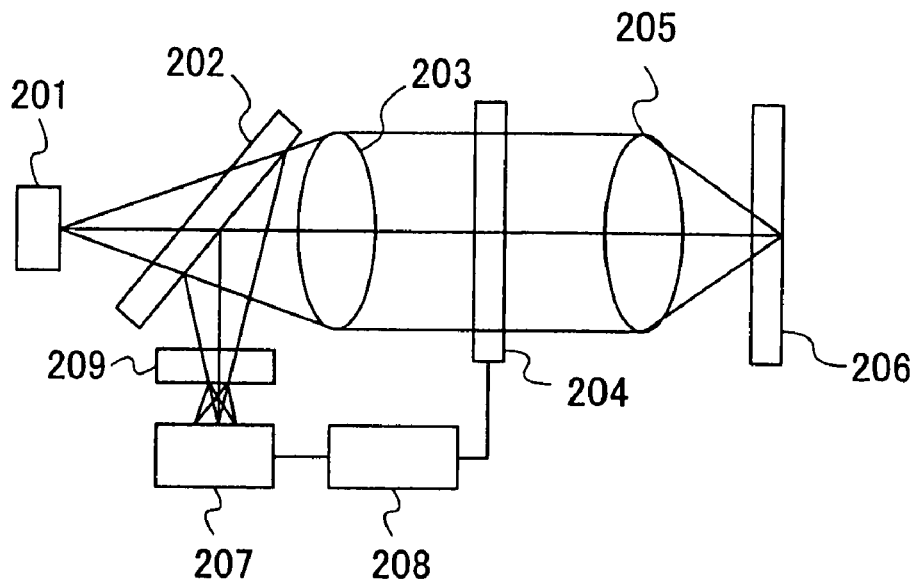
FIG. 3 is a schematic diagram showing an optical system of an optical pickup unit including a conventional aberration detection device.
Figure 4:
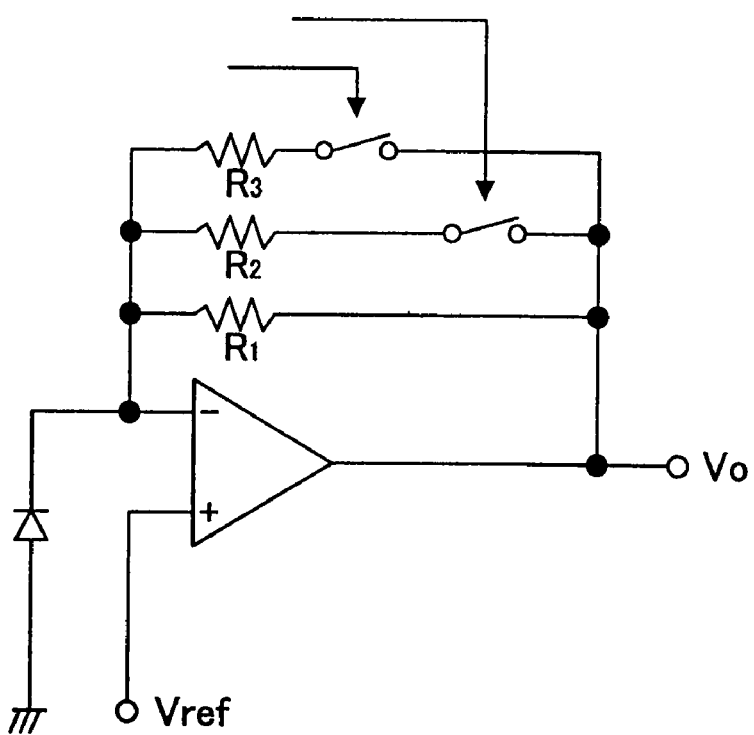
FIG. 4 is a diagram showing a conventional gain switching circuit.

If the amplitude level of a signal is too low, a problem is caused in information reproduction. Therefore, the gain of a current-voltage conversion amplifier succeeding the light-receiving element 311 is switchable so that the output amplitude of the current-voltage conversion amplifier falls within a proper range. However, there has been a necessity of considering the type of the information recording medium 308 or a plurality of conditions of recording and reproduction. For instance, in the case of making the conventional gain switching circuit as shown in FIG. 4 suitable for a plurality of condition patterns, the number of resistors attached to the circuit increases so that a signal response speed is decreased.

According to the present invention, at the time of reproduction, an amount of light reflected from the information recording medium 308 remains unchanged from that in the conventional configuration because of the second electro-optical element 309, while at the time of recording, the transmittance of the second electro-optical element 309 for the light beam reflected from the information recording medium 308 is set to a low rate. Thereby, the gain of the current-voltage conversion amplifier remains the same at the time of recording and at the time of reproduction. Further, the dynamic range of the light-receiving element 311 is restricted so that the output of the light-receiving element 311 is saturated if the input level is too high. According to the present invention, an amount of light directed onto the light-receiving element 311 itself can be controlled by the second electro-optical element 309 so that restriction resulting from the dynamic range can be relaxed.

The second electro-optical element 309 has the same configuration as the first electro-optical element 303 shown in FIG. 17. Further, the second electro-optical element 309 has the aberration detection signal generation region (the fourth region) provided outside the transmittance change region (the third region). The fourth region includes a shutter function for generation of the aberration detection signal. The fourth region, which is a transmittance change part of the same configuration as the third region, has a transparent electrode divided according to the aberration detection signal to be generated.

Figure 21:
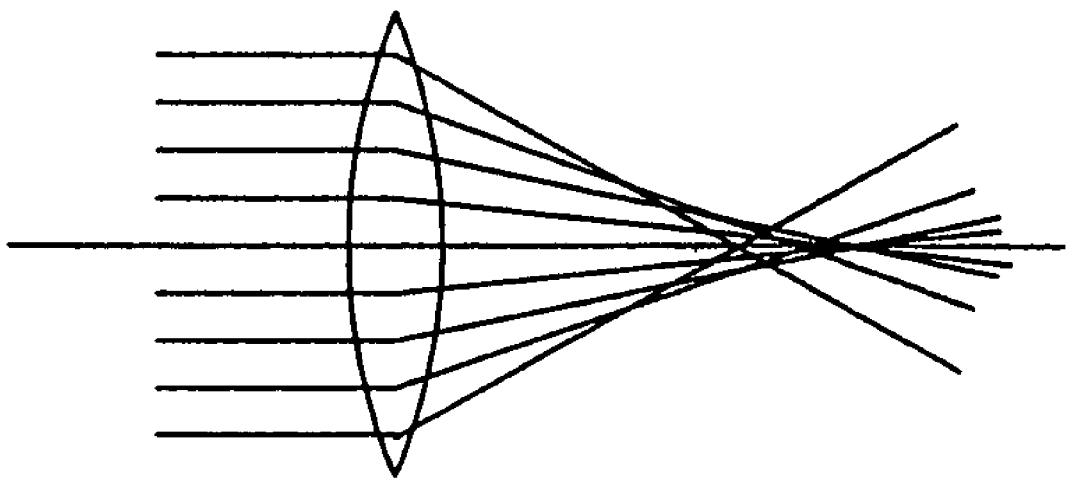
FIG. 21 is another diagram showing the spherical aberration.

As shown in FIG. 21, which is a diagram showing occurrence of spherical aberration, spherical aberration is a phenomenon that the focus position of part of a light beam around the axis of its beam spot is different from that of a peripheral part of the light beam. By separating the two parts of the light beam and detecting the focus position of each of the two parts separately, an amount of spherical aberration can be obtained from a difference between the focus positions. On the other hand, an amount of light to the light-receiving element 311 is required to be controlled in the high-power central region of the light beam. Therefore, stable signal detection and generation of the aberration detection signal for aberration correction can be realized by the single element irrespective of the operation performed (recording or reproduction) and the medium type by dividing the region of the element.

A description will now be given of specific examples of aberration correction and detection by an electro-optical element employed as the first and second electro-optical elements 303 and 309. Needless to say, transmittance for the light beam emitted from the light source (semiconductor laser 301) is changed in the optical path toward the information recording medium 308 (a lighting optical path) and the amount of light directed onto the light-receiving element 311 is controlled in the optical path from the information recording medium 308 (a detection optical path).

If there is a variation in the thickness of the information recording medium 308, spherical aberration occurs when the light beam passes through the substrate of the information recording medium 308. In a first example is shown a configuration of the electro-optical element in the case of correcting this spherical aberration.

Figure 22B:
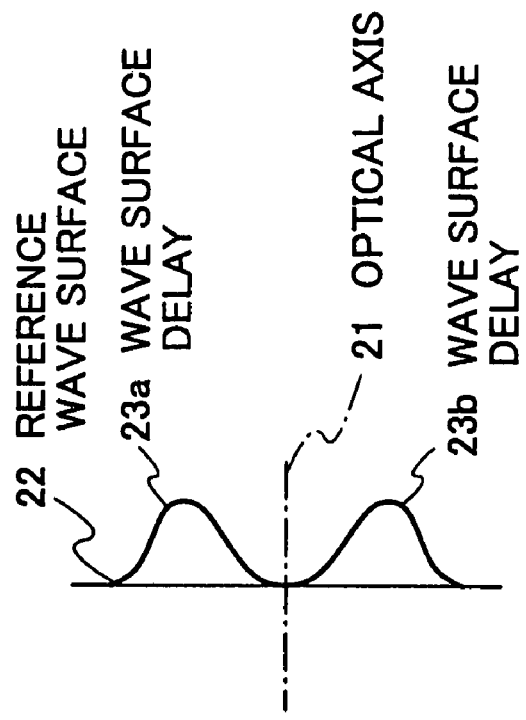
FIG. 22B is a diagram showing a pattern of an electro-optical element for selectively transmitting the light beam.
Figure 22A:
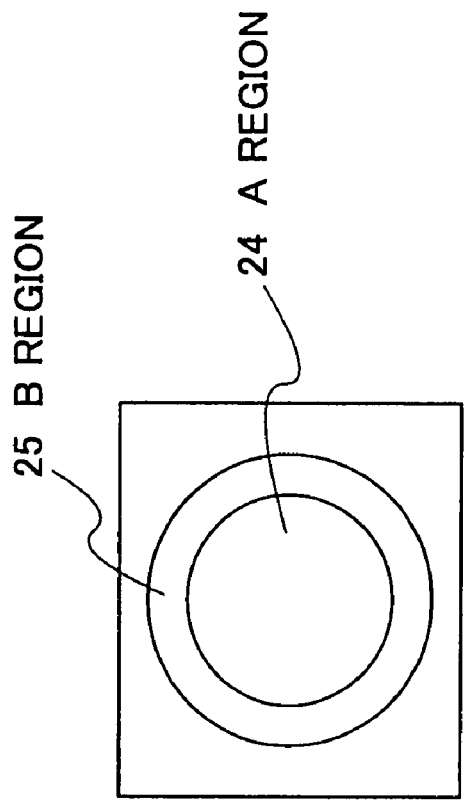
FIG. 22A is a diagram showing a phase of a light beam at a time of occurrence of the spherical aberration.

The spherical aberration is detected by the light-receiving element 311 and the electro-optical element is actuated to cancel this spherical aberration, so that the spherical aberration is corrected. FIG. 22A is a diagram showing wavefront aberration when spherical aberration occurs. The wave surface of the light beam includes delays 23a and 23b with respect to a reference wave surface 22. The delays 23a and 23b occur symmetrically with respect to an optical axis 21. When the reference wave surface 22 is focused, a position at which the delayed wave surface is focused is a defocus with respect to the focus point of the reference wave surface 22.

Therefore, the occurrence of the spherical aberration can be understood by detecting a focus condition by obtaining a difference between the delayed wave surface and the reference wave surface 22. For instance, if the electro-optical element has a pattern shown in FIG. 22B, the aberration detection. signal of the spherical aberration can be generated based on the signal of the light-receiving element 311 obtained by transmitting the light beam selectively through an A region 24 and a B region 25.

Figure 23A:
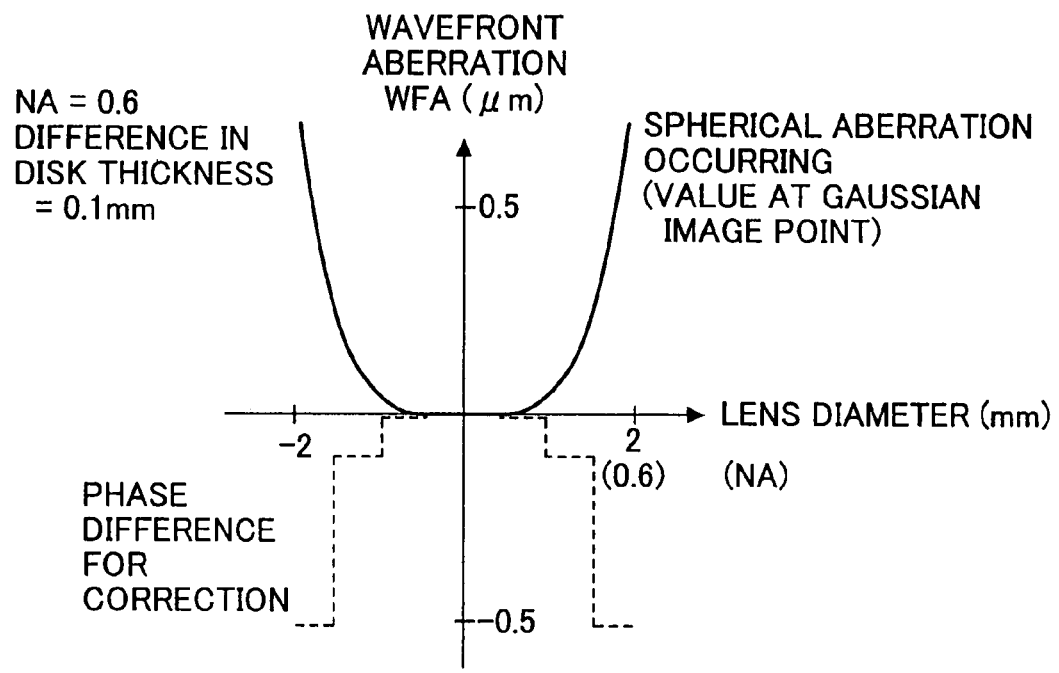
FIG. 23A is a diagram showing a section of the spherical aberration and a phase difference for correcting the spherical aberration.
Figure 23B:
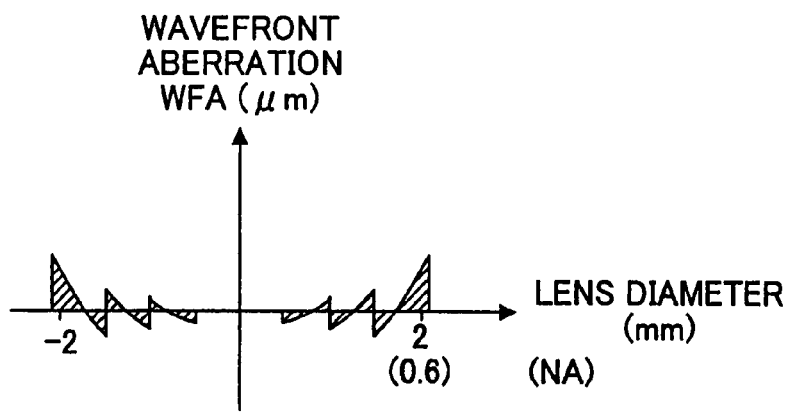
FIG. 23B is a diagram showing the spherical aberration after correction.
Figure 24A:
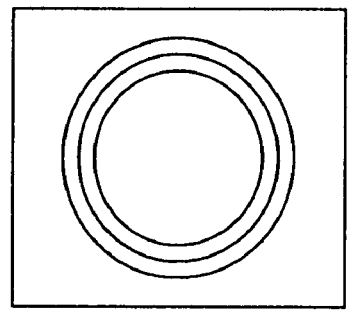
FIGS. 24A through 24C are diagrams showing patterns for correcting the spherical aberration, coma, and astigmatism, respectively, in the electro-optical element.

Next, a description will be given of a configuration for correcting spherical aberration by the electro-optical element based on the aberration detection signal. FIG. 23A is a diagram showing a section of the spherical aberration of FIG. 20A. As shown in FIG. 20A, the spherical aberration becomes greater in proportion to the distance from the optical axis. Therefore, the spherical aberration can be canceled by the electro-optical element (liquid crystal cell) providing the light beam passing therethrough with a phase difference indicated by a broken line in FIG. 23A, which phase difference is reverse to that indicated by the solid line in FIG. 23A. FIG. 23B is a diagram showing the spherical aberration after correction, which is the sum of the solid and broken lines of FIG. 23A. FIG. 23B shows that the spherical aberration is considerably reduced compared with its original amount. FIG. 24A is a diagram showing a pattern for correcting the spherical aberration in the electro-optical element.

If the information recording medium 308 is inclined to have a tilt, coma is generated when the light beam passes through the substrate of the information recording medium 308. In a second example is shown a configuration of the electro-optical element in the case of correcting this coma.

Figure 25A:
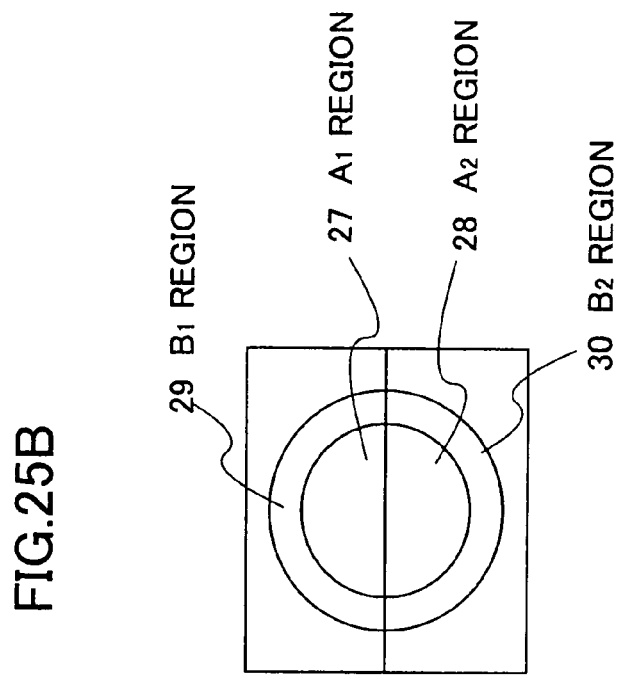
FIG. 25A is a diagram showing a phase of the light beam at a time of occurrence of the coma.

The coma is detected by the light-receiving element 311 so that the electro-optical element is driven to cancel the coma. Thereby, the coma is corrected. FIG. 25A is a diagram showing wavefront aberration when the coma occurs. The wave surface of the light beam includes an advance 26a and a delay 26b with respect to its reference wave surface 22. When the reference wave surface 22 is focused, a position at which each of the advanced and delayed wave surfaces is focused is a defocus with respect to the focus point of the reference wave surface 22.

Figure 25B:
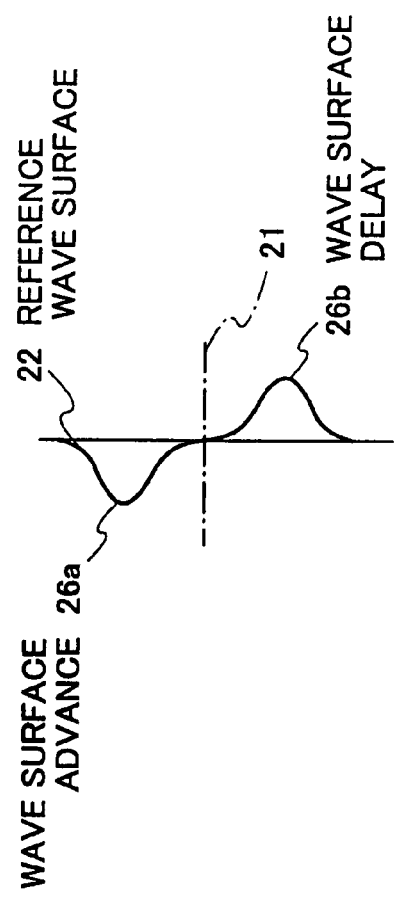
FIG. 25B is a diagram showing a pattern of the electro-optical element for selectively transmitting the light beam.

Therefore, the occurrence of the coma can be understood by detecting a focus condition by obtaining a difference between each of the advanced and delayed wave surfaces and the reference wave surface 22. For instance, if the electro-optical element has a pattern shown in FIG. 25B, the aberration detection signal of the coma can be generated based on the signal of the light-receiving element 311 obtained by transmitting the light beam selectively through an $A_1$ region 27 and a $B_1$ region 29, and an $A_2$ region 28 and a $B_2$ region 30.

Figure 24B:
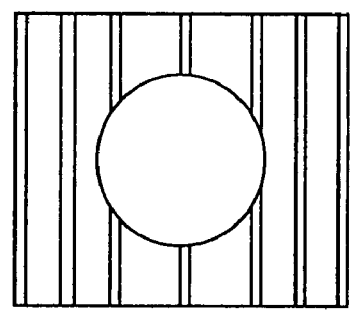
Figure 26A:
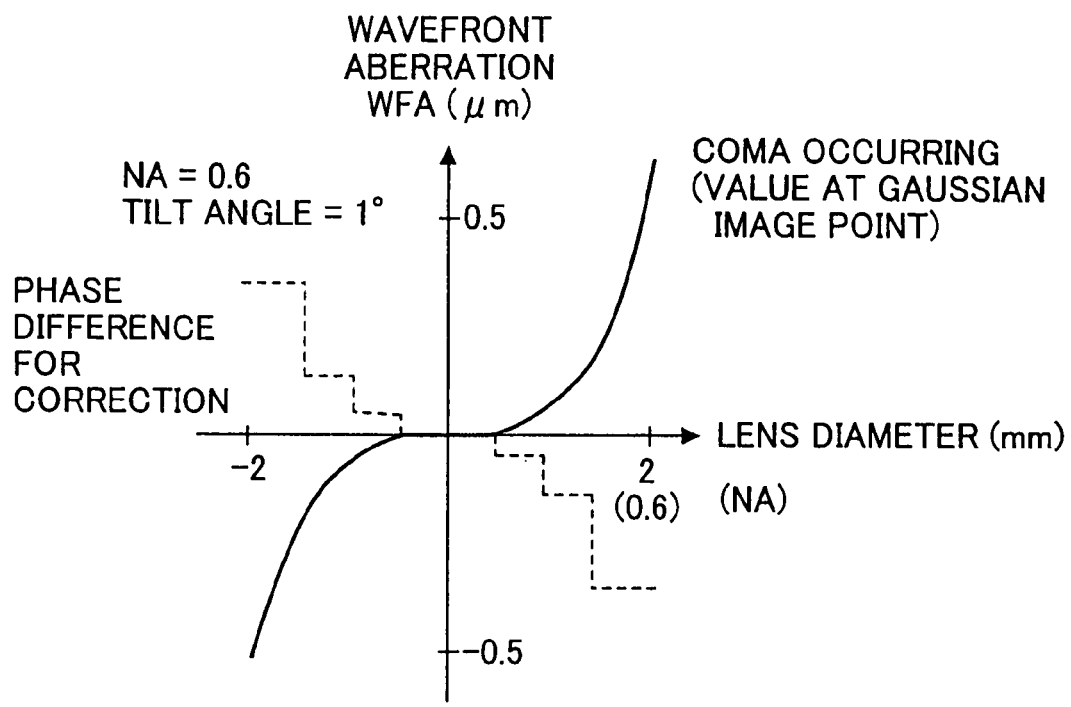
FIG. 26A is a diagram showing a section of the coma and a phase difference for correcting the coma.
Figure 26B:
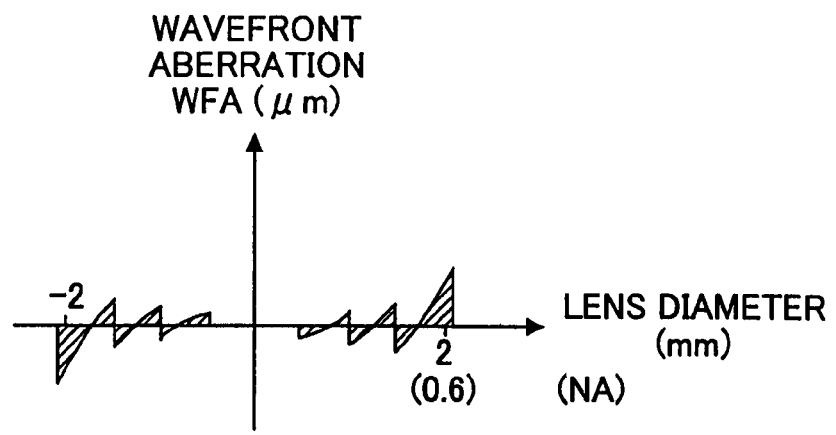
FIG. 26B is a diagram showing the coma after correction.

FIG. 26A is a diagram showing a section of the coma caused by the tilt. In this case as well, the coma due to the tilt can be canceled as shown in FIG. 26B by the electro-optical element (liquid crystal cell) providing the light beam passing therethrough with a phase difference indicated by a broken line in FIG. 26A. FIG. 24B is a diagram showing a pattern for correcting the coma in the electro-optical element.

When the light beam passes through the substrate of the information recording medium 308, astigmatism is generated due to double refraction caused by the information recording medium 308. In a third example is shown a configuration of the electro-optical element for correcting this astigmatism.

Figure 24C:
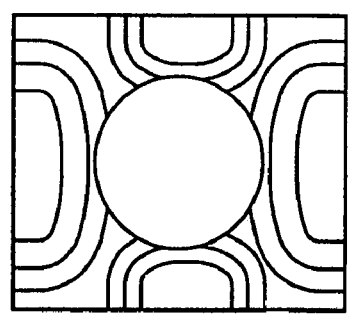

The astigmatism is detected by the light-receiving element 311 so that the electro-optical element is driven to cancel the astigmatism. Thereby, the astigmatism is corrected. Detection of the astigmatism can be performed based on the same idea as detection of the above-described spherical aberration and coma. FIG. 24C is a diagram showing a pattern for correcting the astigmatism in the electro-optical element.

Further, a plurality of types of aberration can be eliminated at the same time by combining the patterns of FIG. 24A through 24C. Furthermore, the above-described electro-optical element may be incorporated into the first and second electro-optical elements 303 and 309 of FIG. 16 as the second and fourth regions thereof.

The optical pickup unit of the seventh embodiment of the present invention can be provided in the information recording and reproduction apparatus of FIG. 15. That is, an information recording and reproduction apparatus according to the seventh embodiment of the present invention can be realized by providing the optical pickup unit of the seventh embodiment in the information recording and reproduction apparatus of FIG. 15.

The present invention is not limited to the specifically disclosed embodiments, but variations and modifications may be made without departing from the scope of the present invention.

The present application is based on Japanese priority patent applications No. 2001-178502 filed on Jun. 13, 2001 and No. 2001-371079 filed on Dec. 5, 2001, the entire contents of which are hereby incorporated by reference.

What is claimed is:

1. An information recording and reproduction apparatus, comprising: an optical pickup unit, the optical pickup unit comprising:
    a light source emitting a light beam;
    an objective lens focusing the light beam onto an information recording medium;
    a light detection part receiving the light beam reflected from the information recording medium; and
    a light blocking part selectively blocking a part of the light beam with respect to a radial direction, the light blocking part provided in an optical path of the light beam to be centered on an optical axis; and
    wherein said optical pickup unit further comprises a control part generating an aberration signal by comparing a first signal generated based on a first part of the light beam passing through a first region of said light blocking part and a second signal generated based on a second part of the light beam passing through a second region of said light blocking part, the first region of said light blocking part being arranged to selectively block the first part of the light beam, and wherein the first part of the light beam is internal to the second part of the light beam, and wherein said first region of said light blocking part is provided internal to the second region of said light blocking part.

2. The information recording and reproduction apparatus as claimed in claim 1, wherein focus positions of the first and second regions of said light blocking part are compared based on the first and second signals.

3. The information recording and reproduction apparatus as claimed in claim 1, wherein said optical pickup unit further comprises a spherical aberration correction part correcting spherical aberration based on the aberration signal generated by said control part.

4. The information recording and reproduction apparatus as claimed in claim 3, wherein said spherical aberration correction part is a liquid crystal element.

5. The information recording and reproduction apparatus as claimed in claim 3, wherein said light blocking part and said spherical aberration correction part comprise a single element.

6. The information recording and reproduction apparatus as claimed in claim 3, wherein said spherical aberration correction part comprises a plurality of concentric regions formed of transparent electrode patterns around the optical axis, the concentric regions providing different phases to the light beam passing through said spherical aberration correction part so as to correct the spherical aberration of the objective lens.

7. The information recording and reproduction apparatus as claimed in claim 3, wherein said spherical aberration correction part comprises a mechanism moving said objective lens so as to correct the spherical aberration.

8. An information recording and reproduction apparatus, comprising: an optical pickup unit, the optical pickup unit comprising:
    a light source emitting a light beam;
    an objective lens focusing the light beam onto an information recording medium;
    a light detection part receiving the light beam reflected from the information recording medium; and
    a light blocking part selectively blocking a part of the light beam with respect to a radial direction, the light blocking part provided in an optical path of the light beam to be centered on an optical axis;
    wherein the information recording medium is a multilayer information recording medium including a plurality of recording layers; focus jump is performed to a desired one of the recording layers that information is to be recorded on or reproduced from so that an amount of spherical aberration with respect to the desired one of the recording layers is detected; and the spherical aberration is corrected based on the detected amount thereof,
    wherein said light blocking part comprises: a turning part selectively turning a plane of polarization of the part of the light beam; and a transmission part selectively blocking the part of the light beam based on a direction of polarization of the part of the light beam, the light beam being incident on said transmission part after being emitted from said turning part, and
    wherein said optical pickup unit further comprises a control part generating an aberration signal by comparing a first signal generated based on a first part of the light beam passing through a first region of said light blocking part and a second signal generated based on a second part of the light beam passing through a second region of said light blocking part, the first region of said light blocking part being provided internal to the second region thereof.

9. The information recording and reproduction apparatus as claimed in claim 8, wherein said turning part comprises first and second regions formed thereon so that the first and second regions provide different planes of polarization to the light beam passing through said turning part.

10. The information recording and reproduction apparatus as claimed in claim 9, wherein the first and second regions of the said turning part are formed of transparent electrode patterns centered on the optical axis, so that light beams are emitted from the first and second regions of said turning part concentrically with each other.

11. The information recording and reproduction apparatus as claimed in claim 8, wherein said turning part selectively turns the plane of polarization of the part of the light beam based on a voltage applied to said turning part.

12. The information recording and reproduction apparatus as claimed in claim 8, wherein said optical pickup unit further comprises a spherical aberration correction part correcting spherical aberration based on the aberration signal generated by said control part.

13. The information recording and reproduction apparatus as claimed in claim 12, wherein said turning part and said spherical aberration correction part comprise a single element.

14. The information recording and reproduction apparatus as claimed in claim 8, wherein said light blocking part comprises a liquid crystal element.

15. The information recording and reproduction apparatus as claimed in claim 8, wherein said optical pickup unit further comprises a spherical aberration correction part correcting spherical aberration.

16. The information recording and reproduction apparatus as claimed in claim 15, wherein said spherical aberration correction part is a liquid crystal element.

17. The information recording and reproduction apparatus as claimed in claim 15, wherein said light blocking part and said spherical aberration correction part comprise a single element.

18. The information recording and reproduction apparatus as claimed in claim 8, wherein said light blocking part selectively blocks the part of the light beam based on a voltage applied to said light blocking part.

* * * * *